(12) United States Patent
Kanade et al.

(10) Patent No.: US 12,413,794 B2
(45) Date of Patent: Sep. 9, 2025

(54) VIDEO SHARING AND ACQUISITION METHOD, AND SERVER, TERMINAL DEVICE AND MEDIUM

(71) Applicant: SHENZHEN INSTITUTE OF ARTIFICIAL INTELLIGENCE AND ROBOTICS FOR SOCIETY, Guangdong (CN)

(72) Inventors: Takeo Kanade, Guangdong (CN); Rui Huang, Guangdong (CN)

(73) Assignee: SHENZHEN INSTITUTE OF ARTIFICIAL INTELLIGENCE AND ROBOTICS FOR SOCIETY, Guangdong (CN)

( * ) Notice: Subject to any disclaimer, the term of this patent is extended or adjusted under 35 U.S.C. 154(b) by 20 days.

(21) Appl. No.: 18/014,158

(22) PCT Filed: Jul. 14, 2021

(86) PCT No.: PCT/CN2021/106226
§ 371 (c)(1),
(2) Date: Dec. 31, 2022

(87) PCT Pub. No.: WO2022/012585
PCT Pub. Date: Jan. 20, 2022

(65) Prior Publication Data
US 2023/0262270 A1  Aug. 17, 2023

(30) Foreign Application Priority Data
Jul. 14, 2020  (CN) .......................... 202010675008.3

(51) Int. Cl.
*H04N 21/218*  (2011.01)
*H04N 21/234*  (2011.01)

(52) U.S. Cl.
CPC . *H04N 21/21805* (2013.01); *H04N 21/23424* (2013.01)

(58) Field of Classification Search
CPC ....... H04N 21/21805; H04N 21/23424; H04N 21/2187; H04N 21/25841; H04N 21/2743;
(Continued)

(56) References Cited

U.S. PATENT DOCUMENTS 10,368,197 B2 * 7/2019 Park ...................... H04W 4/023
2015/0365450 A1  12/2015 Gaunt et al.
(Continued)

FOREIGN PATENT DOCUMENTS

CN  105681763 A  6/2016
CN  107509097 A  12/2017
(Continued)

OTHER PUBLICATIONS

International Search Report for PCT/CN2021/106226 mailed Oct. 13, 2021, ISA/CN.

*Primary Examiner* — Nathan J Flynn
*Assistant Examiner* — Christine A Kurien
(74) *Attorney, Agent, or Firm* — Yue (Robert) Xu; Apex Attorneys at Law, LLP

(57) ABSTRACT

Provided is a video sharing method performed by a server and including: acquiring video data and location points from N capturing terminals respectively, the video data used for recording videos captured by the capturing terminals, the location points used for recording locations of the capturing terminals upon acquiring the video data; sending the location points to M viewing terminals, each of N and M is a positive integer greater than 1; acquiring a target location point from a Q-th terminal, the Q-th terminal being one of the M viewing terminals, 1≤Q≤M, and the target location
(Continued)

point being one of the location points; and sending J-th video data to the Q-th terminal based on the target location point, the J-th video data being video data captured by a J-th terminal at the target location point, and the J-th terminal being one of the N capturing terminals, $1 \leq J \leq N$.

13 Claims, 17 Drawing Sheets

(58) Field of Classification Search
CPC ......... H04N 21/41407; H04N 21/4223; H04N 21/4316; H04N 21/4524; H04N 21/4788; H04N 21/6582; H04N 21/6587; H04N 21/658
See application file for complete search history.

(56) References Cited

U.S. PATENT DOCUMENTS

| | | | |
|---|---|---|---|
| 2016/0286244 A1* | 9/2016 | Chang | ............... H04N 21/4788 |
| 2018/0015369 A1 | 1/2018 | Schupak et al. | |

FOREIGN PATENT DOCUMENTS

| | | | |
|---|---|---|---|
| CN | 108965919 A | 12/2018 |
| CN | 109067889 A | 12/2018 |
| CN | 110446053 A | 11/2019 |
| CN | 111800644 A | 10/2020 |

* cited by examiner

VIDEO SHARING AND ACQUISITION METHOD, AND SERVER, TERMINAL DEVICE AND MEDIUM

This application is the national phase of International Application No. PCT/CN2021/106226, titled "VIDEO SHARING AND ACQUISITION METHOD, AND SERVER, TERMINAL DEVICE AND MEDIUM", filed on Jul. 14, 2021, which claims priority to Chinese Patent Application No. 202010675008.3, titled "VIDEO SHARING AND ACQUISITION METHOD, AND SERVER, TERMINAL DEVICE AND MEDIUM", filed on Jul. 14, 2020 with the China National Intellectual Property Administration (CNIPA), both of which are incorporated herein by reference in its entirety.

FIELD

The present disclosure relates to the field of electronic technology, and in particular, to a video sharing method, a video acquiring method, a server, a terminal device and a medium.

BACKGROUND

With the popularity of the Internet and smart devices, a large number of video transmission and sharing technologies have emerged. There are mainly the following types in the existing technology.

One type is a live streaming website. This type of website is mainly for an anchor to share videos in real time through a live streaming platform. Generally, an individual is the main subject of this type of live streaming website, so as to realize one-to-many video sharing. But there is only a single live broadcast perspective, lacking purports and actual values.

The other type is a video surveillance network. It is generally used in the security field. Multiple fixed cameras form a video surveillance network, and then a terminal monitors video images captured by each camera in the surveillance network in real time. In this way, when multiple video sources are shared to a same user, the shared user has to record addresses, usernames and passwords of all the video sources, which is very inconvenient for the user and is not conductive to video sharing. Also, since the cameras of the video surveillance network are fixed, it is not possible to flexibly change contents to be captured.

Generally, video transmission and sharing method in the conventional technology still need to be improved.

SUMMARY

A video sharing method, a video acquiring method, a server, a terminal device and a medium are provided in embodiments of the present disclosure, so as to solve the problem of lack of flexibility in video sharing.

In view of this, a video sharing method is provided in the present disclosure. The video sharing method includes:
acquiring, by a server, video data and location points from N capturing terminals respectively, where the video data is used for recording videos captured by the capturing terminals, and the location points is used for recording locations of the capturing terminals upon acquiring the video data, where N is a positive integer greater than 1;
sending, by the server, the location points respectively acquired by the N capturing terminals to M viewing terminals, where M is a positive integer greater than 1;
acquiring, by the server, a target location point from a Q-th terminal, where the Q-th terminal is one of the M viewing terminals, and $1 \leq Q \leq M$, and the target location point is one of the location points respectively acquired by the N capturing terminals; and
sending, by the server, J-th video data to the Q-th terminal based on the target location point, where the J-th video data is video data captured by a J-th terminal at the target location point, and the J-th terminal is one of the N capturing terminals, where $1 \leq J \leq N$.

A video acquiring method is further provided in an embodiment of the present disclosure. The video acquiring method includes:
acquiring, by a viewing terminal, at least one location point from a server, where the at least one location point is uploaded to the server by N capturing terminals after capturing video data in a target area, where N is a positive integer greater than 1;
displaying, by the viewing terminal, a map interface on a display interface, where the map interface is a map interface of the target area, and the map interface includes the at least one location point;
acquiring, by the viewing terminal, a target location point selected by a user from the map interface, where the target location point is one of the at least one location point;
sending, by the viewing terminal, the target location point to the server; and acquiring, by the viewing terminal, J-th video data from the server, where the J-th video data is video data captured by a J-th terminal at the target location point in the target area, and the J-th terminal is one of the N capturing terminals, where $1 \leq J \leq N$.

A video sharing apparatus is further provided in an embodiment of the present disclosure. The video sharing apparatus includes:
an acquiring unit, configured to acquire video data and location points from N capturing terminals respectively, where the video data is used for recording videos captured by the capturing terminals, and the location points is used for recording locations of the capturing terminals upon acquiring the video data, where N is a positive integer greater than 1;
a sending unit, configured to send the location points acquired by the acquiring unit respectively from the N capturing terminals to M viewing terminals, where M is a positive integer greater than 1;
the acquiring unit is further configured to acquire a target location point from a Q-th terminal, where the Q-th terminal is one of the M viewing terminals and $1 \leq Q \leq M$, and the target location point is one of the location points respectively acquired by the N capturing terminals; and
the sending unit is further configured to send J-th video data to the Q-th terminal based on the target location point acquired by the acquiring unit, where the J-th video data is video data captured by a J-th terminal at the target location point, and the J-th terminal is the J-th terminal among the N capturing terminals, where $1 \leq J \leq N$.

In an embodiment, the sending unit is further configured to send identification information of R capturing terminals to the Q-th terminal, where the R capturing terminals are terminals that have captured video data at the target location point among the N capturing terminals, and $R \leq N$, and the identification information is used for identifying the corresponding capturing terminals;

the acquiring unit is further configured to acquire identification information of a target terminal from the Q-th terminal, where the target terminal is one of the R capturing terminals; and the sending unit is further configured to send target video data captured by the target terminal at the target location point to the Q-th terminal.

In an embodiment, the apparatus further includes a first stitching unit. In a case that a server determines the J-th terminal as a popular terminal at the target location point based on a first preset rule, and the J-th terminal is not the target terminal, the first stitching unit is configured to:

stitch, by the server, the J-th video data and target video data into recommended video data;

the sending unit is further configured to send the recommended video data to the Q-th terminal.

In an embodiment, the apparatus further includes a modeling unit and a comparison unit. The modeling unit is configured to acquire an environment model, and the environment model is used for recording capturing environments of the N capturing terminals;

the comparison unit is configured to compare the video data respectively captured by the N capturing terminals with the environment model acquired by the modeling unit, to determine capturing angles of the N capturing terminals, where the capturing angles may be angles at which the capturing terminals are capturing;

the sending unit is configured to send the capturing angles of the N capturing terminals to the M viewing terminals;

the acquiring unit is further configured to acquire a target capturing angle from the Q-th terminal, where the target capturing angle is one of the capturing angles of the N capturing terminals;

the sending unit is configured to send the J-th video data to the Q-th terminal based on the target capturing angle, where the J-th video data is video data captured by the J-th terminal at the target capturing angle.

In an embodiment, the apparatus further includes a second stitching unit. In a case that the server determines the target location point as a popular location point based on a second preset rule, the second stitching unit is configured to:

acquire P pieces of video data captured by the R capturing terminals at the target location point, where P is a positive integer greater than 1; and stitch the P pieces of video data into one piece of panoramic video data based on capturing angles of the P pieces of video data, where the panoramic video data records captured images in the P pieces of video data;

the sending unit is further configured to:

send, by the server, the panoramic video data to the Q-th terminal upon the server acquiring the target location point from the Q-th terminal.

In an embodiment, the acquiring unit is further configured to acquire time points from the N capturing terminals respectively, where the time points are used for recording moments at which the capturing terminals are acquiring the video data;

the sending unit is further configured to send the time points respectively acquired by the N capturing terminals to the M viewing terminals;

the acquiring unit is further configured to acquire a target time point from the Q-th terminal, where the target time point is one of the time points respectively acquired by the N capturing terminals;

the sending unit is further configured to send the J-th video data to the Q-th terminal based on the target time point, where the J-th video data is video data acquired by the J-th terminal at the target time point.

In an embodiment, the apparatus further includes a third stitching unit. The acquiring unit is further configured to acquire S pieces of video data from the video data sent by the N capturing terminals, and the S pieces of video data are all video data captured at the target location point within a target time period;

the third stitching unit is configured to stitch features recorded in the S pieces of video data into fused video data, and the fused video data record all features captured at the target location point within the target time period;

the sending unit is further configured to send the fused video data to the Q-th terminal.

A video acquiring apparatus is also provided in an embodiment of the present disclosure. The video acquiring apparatus includes:

a first acquiring unit, configured to acquire at least one location point from a server, where the at least one location point is uploaded to the server by N capturing terminals after capturing video data in a target area, and N is a positive integer greater than 1;

a display unit, configured to display a map interface on a display interface, where the map interface is a map interface of the target area, and the map interface includes the at least one location point acquired by the first acquiring unit;

a second acquiring unit, configured to acquire a target location point selected by a user from the map interface, where the target location point is one of the at least one location point;

a sending unit, configured to send the target location point acquired by the second acquiring unit to the server; and the first acquiring unit is further configured to acquire J-th video data from the server, where the J-th video data is video data captured by a J-th terminal at the target location point in the target area, and the J-th terminal is one of the N capturing terminals, where 1≤J≤N.

In an embodiment, in a case that there are multiple capturing terminals capturing video data at the target location point, the first acquiring unit is further configured to acquire identification information of R capturing terminals from the server, where all the R capturing terminals are capturing terminals that have captured video data at the target location point, where 1≤R≤N;

the display unit is configured to display the identification information of the R capturing terminals on the display interface;

the second acquiring unit is further configured to acquire the identification information of the J-th terminal selected by the user, where the J-th terminal is one of the R capturing terminals;

the sending unit is configured to send the identification information of the J-th terminal to the server.

In an embodiment, the first acquiring unit is further configured to acquire capturing angles of the N capturing terminals from the server;

the display unit is configured to display the capturing angles of the R capturing terminals on the display interface;

the second acquiring unit is further configured to acquire a target capturing angle selected by the user, where the target capturing angle is one of the capturing angles of the R capturing terminals;

the sending unit is configured to send the target capturing angle to the server, where the target capturing angle is used for requesting the server to send video data captured by the capturing terminals at the target capturing angle.

In an embodiment, the first acquiring unit is further configured to acquire at least one time point from the server, where the at least one time point is time points at which the N capturing terminals are capturing the video data;

the display unit is further configured to display the at least one time point on the display interface;

the second acquiring unit is further configured to acquire a target time point selected by the user, where the target time point is one of the at least one time point;

the second acquiring unit is further configured to send the target time point to the server, where the target time point is used for requesting the server to send video captured by the capturing terminals at the target time point.

A server is further provided in an embodiment of the present disclosure. The server includes: an interactive device, an input/output (I/O) interface, a processor and a memory. The memory stores program instructions. The interactive device is configured to acquire an operation instruction inputted by a user, and the processor is configured to execute the program instructions stored in the memory, to implement the video sharing method according to any one of the above described embodiments.

A server is further provided in an embodiment of the present disclosure. The server includes: an interactive device, an input/output (I/O) interface, a processor and a memory. The memory stores program instructions. The interactive device is configured to acquire an operation instruction inputted by a user, and the processor is configured to execute the program instructions stored in the memory, to implement the video acquiring method according to any one of the above described embodiments.

A computer-readable storage medium is further provided in an embodiment of the present disclosure. Instructions, when executed on a computer device, cause the computer device to implement the video sharing method according to any one of the above described embodiments.

A computer-readable storage medium is further provided in an embodiment of the present disclosure. Instructions, when executed on a computer device, cause the computer device to implement the video acquiring method according to any one of the above described embodiments.

The above technical solutions of the embodiments of the present disclosure have the following advantages.

A video sharing method is provided in an embodiment of the present disclosure. The video sharing method includes: acquiring, by a server, video data and location points from N capturing terminals respectively, where the video data is used for recording videos captured by the capturing terminals, and the location points is used for recording locations of the capturing terminals upon acquiring the video data, and N is a positive integer greater than 1; sending, by the server, the location points respectively acquired by the N capturing terminals to M viewing terminals, where M is a positive integer greater than 1; acquiring, by the server, a target location point from a Q-th terminal, where the Q-th terminal is one of the M viewing terminals and 1≤Q≤M, and the target location point is one of the location points respectively acquired by the N capturing terminals; and sending, by the server, J-th video data to the Q-th terminal based on the target location point, where the J-th video data is video data captured by a J-th terminal at the target location point, and the J-th terminal is the J-th terminal among the N capturing terminals, where 1≤J≤N. With this method, multiple video capturing terminals can share video images to multiple viewing terminals, and users of multiple viewing terminals can autonomously select the video images shared by the capturing terminals located in different locations, thereby realizing many-to-many video sharing mode. The video sharing method can be applied to various scenarios, to enrich the video sharing and improve the convenience thereof.

DETAILED DESCRIPTION

A video sharing method, a video acquiring method, a server, a terminal device and a medium are provided in embodiments of the present disclosure.

In order to enable those skilled in the art to better understand solutions of the present disclosure, the technical solutions in embodiments of the present disclosure will be clearly and completely described below in conjunction with the accompanying drawings in the embodiments of the present disclosure. Obviously, the described embodiments are merely a part of, rather than all of embodiments of the present disclosure. Based on the embodiments in the present disclosure, any other embodiments obtained by those skilled in the art without creative efforts shall fall within the scope of protection of the present disclosure.

The terms "first", "second", "third", "fourth", etc. (if any) in the description, claims and the above drawings of the present disclosure are used to distinguish similar objects and not necessarily describe a specific order or sequence. It can be understood that the terms so used are interchangeable under appropriate circumstances, such that the embodiments described herein can be implement in sequences other than those illustrated or described herein. Furthermore, the terms "comprising" and "having", as well as any variations thereof, are intended to cover a non-exclusive inclusion, for example, a process, method, system, product or device including a sequence of steps or units is not necessarily limited to those explicitly listed steps or units, instead, may include other steps or units not explicitly listed or inherent to the process, method, product or device.

With the popularity of the Internet and smart devices, a large number of video transmission and sharing technologies have emerged. Currently, the video transmission and sharing technologies mainly include the following types.

Figure 1:
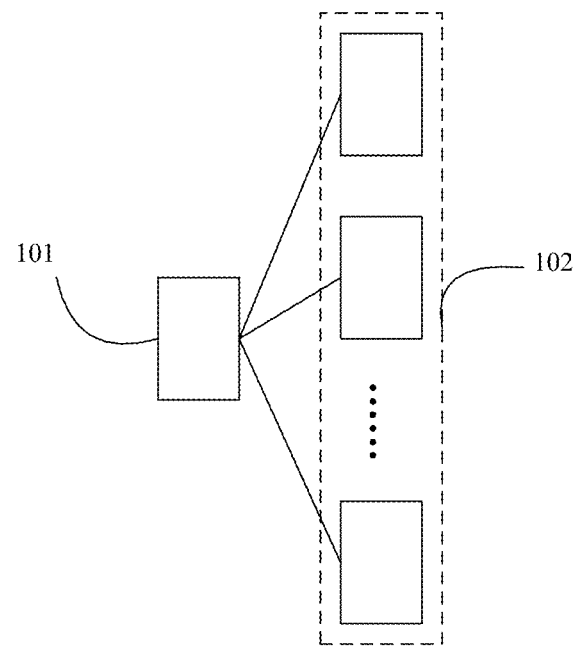
FIG. 1 is a system architecture diagram of a live streaming website.

One type is a live streaming website. This type of website is mainly for an anchor to share videos in real time through a live streaming platform. Generally, an individual is the main subject of this type of live streaming website, so as to realize one-to-many video sharing. As shown in FIG. 1, the live broadcast website architecture includes a live broadcast terminal 101 and multiple viewing terminals 102. The live broadcast terminal 101 acquires and generates video images, and then shares them with multiple viewing terminals 102, so that the multiple viewing terminals 102 can watch images captured by the live broadcast terminal 101 in real-time. But such architecture only has a single live broadcast perspective, lacking purports and actual values.

Figure 2:
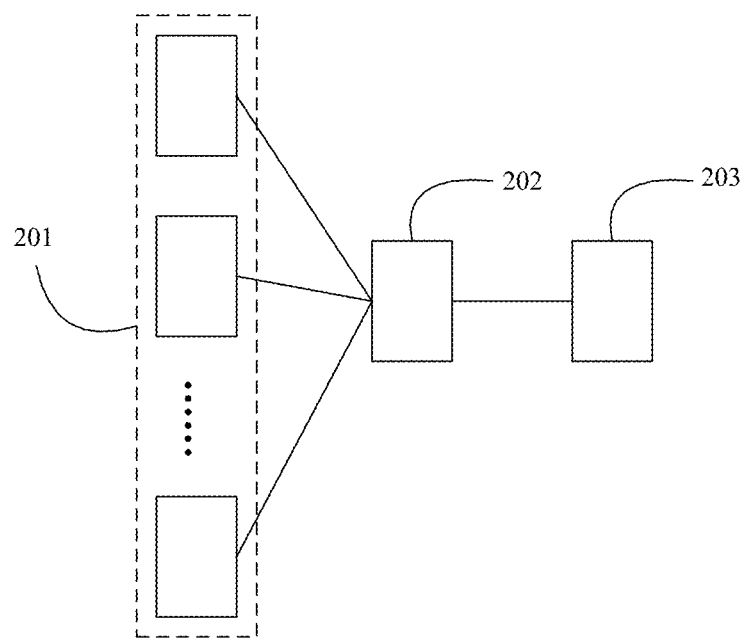
FIG. 2 is a system architecture diagram of a video surveillance network.

The other type is a video surveillance network. It is generally used in the security field. Multiple fixed cameras 201 form a video surveillance network, and then a terminal 203 monitors video images captured by the cameras 201 in the surveillance network in real time. As shown in FIG. 2, the architecture of the video surveillance network includes multiple cameras 201 fixedly distributed in different places, and a server 202 connected to the cameras 201. The server 202 gathers these videos and sends the videos to the terminal 203, and then the terminal 203 watches all the video images, which is a many-to-one video sharing method. In this way, video sharing can be realized, however, a user to share videos needs to have an authority to access the server 202, and a user with whom the videos are to be shared has to record addresses, user names and passwords of all video sources with going through strict authentication steps, which is very inconvenient for users. Therefore, this scenario is not conducive to video sharing. Furthermore, since the cameras 201 of the video surveillance network are fixed, it is not possible to flexibly change contents to be captured, which has a poor mobility.

In view of this, a video sharing method is provided in an embodiment of the present disclosure. With the method, video data is collected by multiple capturing terminals and then shared with multiple viewing terminals, so as to realize a many-to-many video sharing.

It should be noted that the method provided in an embodiment of the present disclosure may be applied to video sharing of real-time live broadcast, and may also be applied to video sharing of recorded broadcast, which is not limited in the embodiment of the present disclosure.

A video sharing method according to an embodiment of the present disclosure will be described in detail below with reference to the accompanying drawings for better understanding.

Firstly, a system architecture of the method according to the embodiment of the present disclosure is described.

Figure 3:
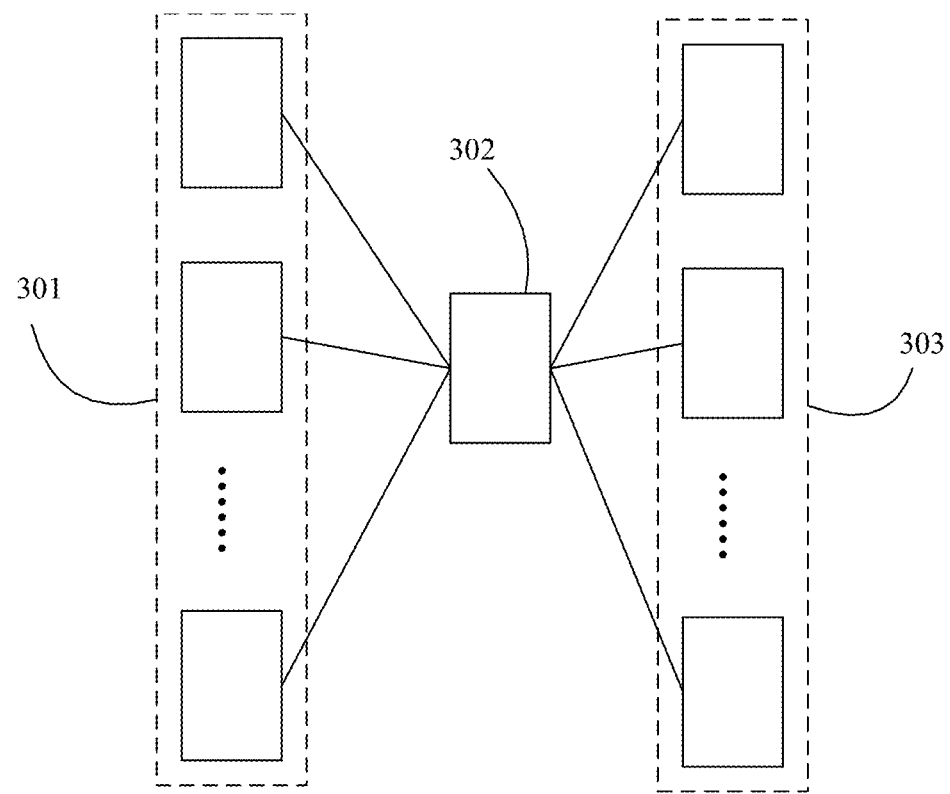
FIG. 3 is a system architecture diagram of a video sharing method according to an embodiment of the present disclosure.

Referring to FIG. 3, the operation system architecture of the method according to the embodiment of the present disclosure may include a capturing terminal 301, a server 302 and a viewing terminal 303.

As shown in FIG. 3, there may be multiple capturing terminals 301. In a specific working process, the capturing terminal 301 may be a smart phone, a tablet computer, a smart watch, smart glasses, a camera with communication function, or an intelligent terminal (e.g., a communication and capturing vehicle) capable of acquiring video data, which is not limited in this embodiment of the present disclosure. Users of these capturing terminals 301 are users who need to share videos. These users may move freely with the capturing terminals 301 to capture contents they want to share in different scenarios.

The server 302 is used to acquire video data uploaded by all the capturing terminals 301, and schedule these video data in a unified manner.

As shown in FIG. 3, there may be multiple viewing terminals 303. In the specific working process, the capturing terminal 301 may be a smart phone, a tablet computer, a desktop computer, a smart watch, smart glasses or a virtual reality device (virtual reality, VR), which is not limited in this embodiment of the present disclosure. These viewing terminals 303 are used to watch the video shared by the capturing terminal 301. A viewing terminal 303 sends a request to the server 302 to obtain the video data sent by the server 302, and the video data is captured by the capturing terminal 301.

Figure 4A:
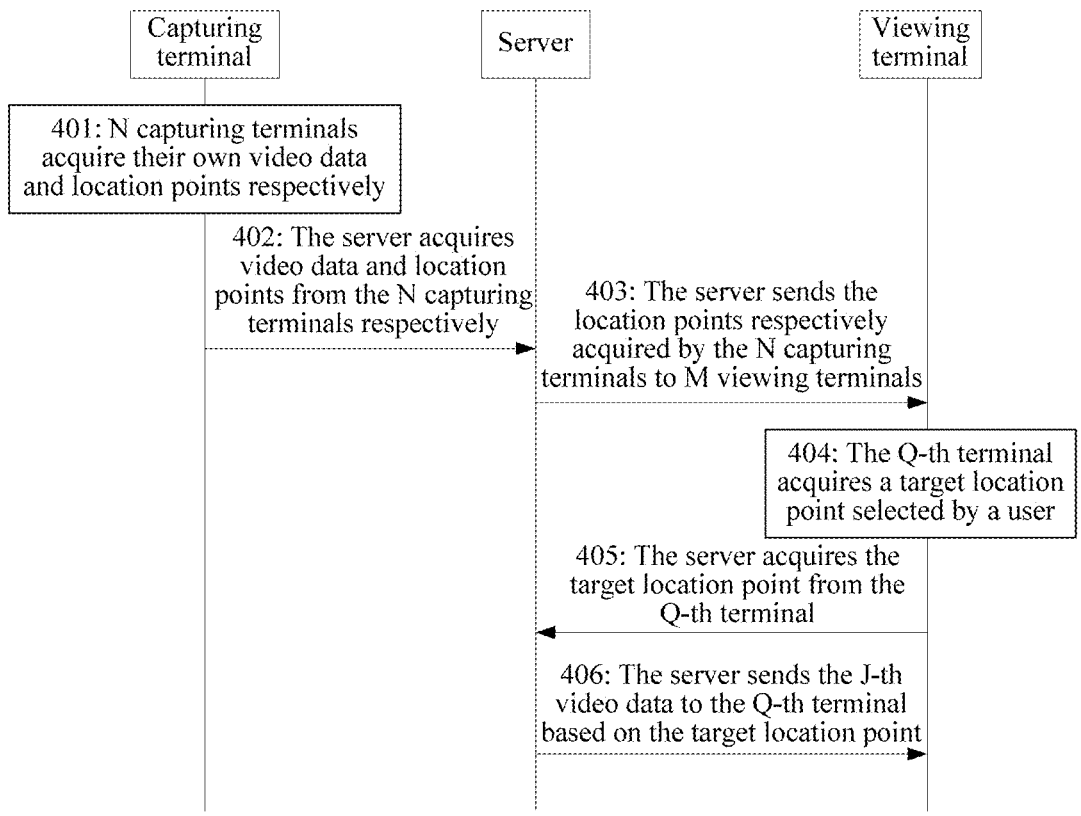
FIG. 4a is a schematic diagram of a video sharing method according to an embodiment of the present disclosure.

Based on the system architecture shown in FIG. 3, now reference may be made to FIG. 4a. As shown in FIG. 4a, the video sharing method according to a first embodiment of the present disclosure may include the following steps 401 to 406.

In step 401, N capturing terminals acquire their own video data and location points, respectively.

Figure 4B:
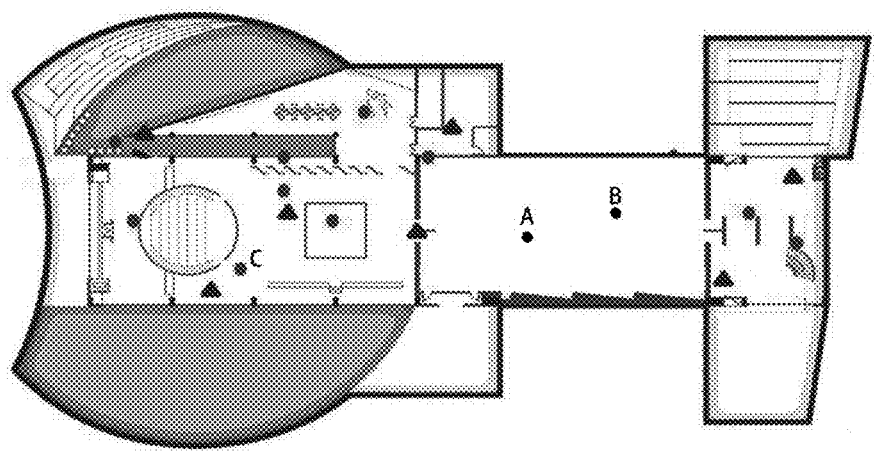
FIG. 4b is a schematic diagram of a video sharing method according to an embodiment of the present disclosure.

In this embodiment, FIG. 4b is a planar map of a venue, in which the location points A, B, and C in the map are respectively the capturing locations of the capturing terminals in the venue. There are N capturing terminals to capture videos in the venue, where N is a positive integer greater than 1. For example, a J-th terminal is one of the N capturing terminals, and the J-th terminal captures video data at point A in the map. At this time, the J-th terminal acquires J-th video data and the location point A.

In step 402, a server acquires video data and location points from the N capturing terminals respectively.

In this embodiment, the N capturing terminals send the video data and the location points acquired respectively to the server. For example, the J-th terminal sends the J-th video data and the location point A to the server. Terminals other than the J-th terminal among the N capturing terminals also perform the same operation.

Furthermore, the server records a corresponding relationship between video data and location points, so as to know at which location point each video data is captured.

In step 403, the server sends the location points respectively acquired by the N capturing terminals to M viewing terminals.

In this embodiment, M is a positive integer greater than 1. The server sends the acquired location points to multiple viewing terminals, so that these viewing terminals can know location points at which the video data captured by the capturing terminals can be seen.

In an embodiment, an interface of the viewing terminal may be as shown in FIG. 4b. FIG. 4b is a map of an exhibition hall, in which some location points are marked in the map. All of these location points are the location points sent by the server to the viewing terminals, so that a user can intuitively know which location points in the exhibition hall can see the video data captured by the capturing terminals via the interface.

In step 404, a Q-th terminal acquires a target location point selected by a user.

In this embodiment, the Q-th terminal is one of the M viewing terminals. As described above, an interactive interface of the Q-th terminal shows the interface as shown in FIG. 4b to the user. If the user clicks a location point, for example, the user clicks the location point A on the interface, the Q-th terminal sends the location point A as the target location point to the server at this time.

In step 405, the server acquires the target location point from the Q-th terminal.

In this embodiment, the Q-th terminal sends the target location point to the server, so that the server knows video data that the Q-th terminal expects to obtain.

In step 406, the server sends J-th video data to the Q-th terminal based on the target location point.

In this embodiment, it can be known which capturing terminal has captured video data at the target location point. For example, If the target location point is the location point A, and the J-th terminal has captured J-th video data at the location point A, then the server sends the J-th video data to the Q-th terminal according to the target location point.

In this embodiment, the server acquires video data and location points from the N capturing terminals respectively. The video data is used for recording videos captured by the capturing terminals, and the location points are used for recording locations of the capturing terminals upon acquiring the video data, where N is a positive integer greater than 1. The server sends the location points respectively acquired by the N capturing terminals to M viewing terminals, where M is a positive integer greater than 1. The server acquires a target location point from a Q-th terminal, where the Q-th terminal is one of the M viewing terminals and 1≤Q≤M, the target location point is one of the location points respectively acquired by the N capturing terminals. The server sends J-th video data to the Q-th terminal based on the target location point, where the J-th video data is video data captured by a J-th terminal at the target location point, and the J-th terminal is the J-th terminal among the N capturing terminals, where 1≤J≤N. With this method, multiple video capturing terminals can share video images to multiple viewing terminals, and users of multiple viewing terminals can autonomously select the video images shared by the capturing terminals located in different locations, thereby realizing many-to-many video sharing. The video sharing method can be applied to various scenarios, to enrich the video sharing and improve the convenience thereof.

It should be noted that since the N capturing terminals can be moved freely under the will of users, each capturing terminals may have captured video data at different location points. Also, multiple capturing terminals may capture data at a same location point. For example, when a user of the viewing terminal selects a target location point, video data captured by multiple capturing terminals may be available for viewing at the target location point. In this case, it is necessary to confirm with the user of the viewing terminal to watch the video image captured by which capturing terminal. For the convenience of understanding, the specific way of working in this case will be described in detail below in conjunction with the accompanying drawings.

Figure 5A:
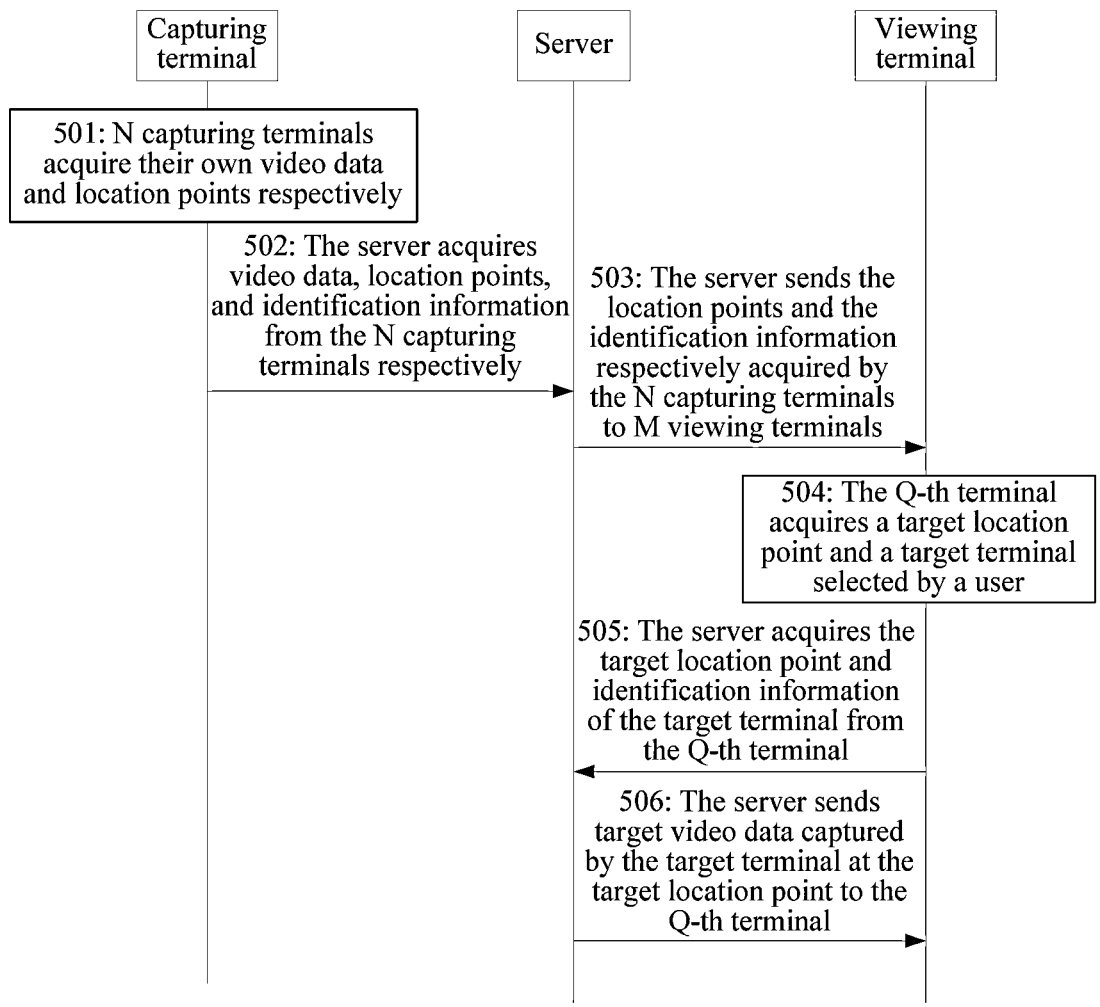
FIG. 5a is a schematic diagram of a video sharing method according to another embodiment of the present disclosure.

Referring to FIG. 5a, a video sharing method according to a second embodiment of the present disclosure includes the following steps 501 to 506.

In step 501, N capturing terminals acquire their own video data and location points respectively.

In this embodiment, the above step 401 may be referenced to the step 501, the detail of which will not be repeated here.

In step 502, a server acquires video data, location points and identification information from the N capturing terminals respectively.

In this embodiment, the above step 402 may be referenced to the specific working way of the server to acquire video data and location points from the N capturing terminals respectively, the detail of which will be repeated here. Further, the N capturing terminals send their identification information to the server, and the identification information is used for uniquely identifying each capturing terminal.

In step 503, the server sends the location points and the identification information respectively acquired by the N capturing terminals to M viewing terminals.

In this embodiment, the description of the above step 403 may be referenced to the step of the server sending the location points to the M viewing terminals, the detail of which will be repeated here. Further, the server sends the acquired identification information to the M viewing terminals.

Further, when the identification information of the N capturing terminals is sent by the server to the M viewing terminals, descriptive information of the N capturing terminals may also be sent along with the identification information. The descriptive information is information uploaded by the capturing terminals upon registering with the server, and for example, the description information may be a nickname, text profile, avatar or other information of the capturing terminals. The server acquires the description information of the capturing terminals identified by the identification information at the same time when sending the identification information, and sends the description information to the M viewing terminals respectively.

In step 504, the Q-th terminal acquires a target location point and a target terminal selected by a user.

Figure 5B:
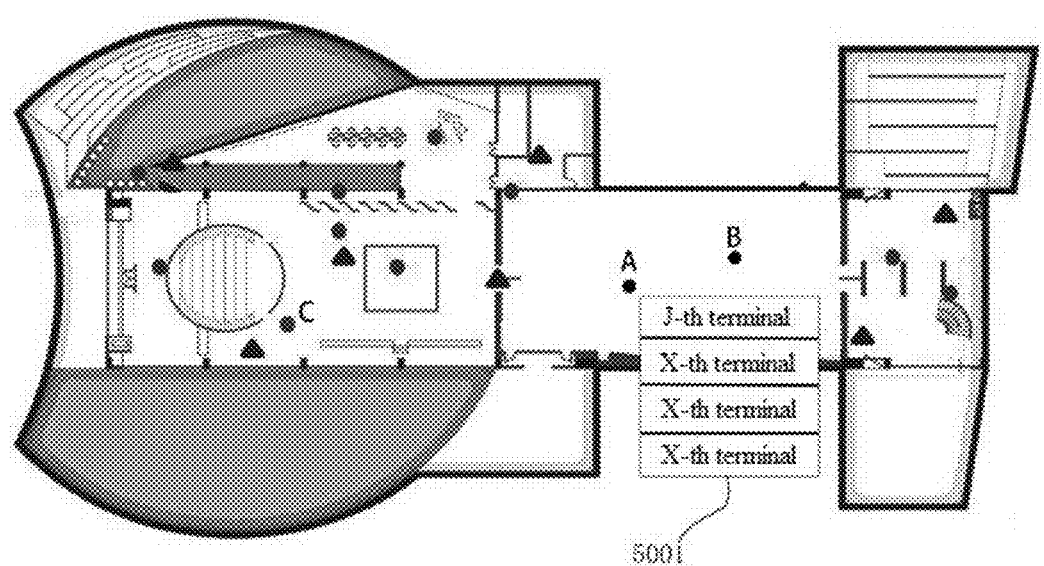
FIG. 5b is a schematic diagram of a video sharing method according to an embodiment of the present disclosure.

In this embodiment, the Q-th terminal is one of the M viewing terminals. An interactive interface of the Q-th terminal shows the interface as shown in FIG. 5b to the user. If the user clicks a location point, for example, the user clicks the location point A on the interface, the Q-th terminal takes the location point A as the target location point. And if there are video data captured by R capturing terminals near the location point A for selection, then the Q-th terminal displays an option menu 5001 on the interactive interface. The option menu displays the identification information of the R capturing terminals at the location point A available for selection, where R is a positive integer less than or equal to N.

In an embodiment, the option menu 5001 may display the description information of the R capturing terminals, and the description information may include a nickname, text profile, avatar or other information, so that the user of the viewing terminal can make a decision and select a target terminal that he or she wants to watch.

For example, if the user of the viewing terminal clicks the J-th terminal among the R capturing terminals in the option menu 5001, then the Q-th terminal acquires that the target location point selected by the user is the location point A, and the target terminal is the J-th terminal.

In step 505, the server acquires the target location point and identification information of the target terminal from the Q-th terminal.

In this embodiment, in the step 504, the Q-th terminal acquires that the target location point selected by the user is the location point A, and the target terminal is the J-th terminal. Then, the Q-th terminal sends the identification information of the J-th terminal and the location point A to the server, so that the server knows that the Q-th terminal expects to obtain video data captured by the J-th terminal at the location point A.

In step 506, the server sends target video data captured by the target terminal at the target location point to the Q-th terminal.

In this embodiment, the target location point selected by the Q-th terminal is the location point A and the target terminal is the J-th terminal, thus the server sends the video data captured by the J-th terminal at the location point A to the Q-th terminal, thereby realizing video acquisition of the Q-th terminal.

In this embodiment, since the target terminal is the above-mentioned J-th terminal, the J-th video data captured by the J-th terminal is sent.

In this embodiment, in combination with the possibility that there may be multiple capturing terminals capturing video data at a same point in the many-to-many video sharing scenario, identification information is provided to the user of the viewing terminal for selection, and description information may also be attached with the identification information, so that the sharing of video has social attributes, and the user of the viewing terminal can select, according to the description information, the capturing terminal he or she is interested in to watch video.

It should be noted that, in the working way of the second embodiment, when there are multiple capturing terminals capturing at a same location point, there is a possibility that one of the capturing terminals is a popular terminal, and video captured by the popular terminal has been selected by multiple viewing terminals. Therefore, the video captured by the popular terminal may be recommended to the viewing terminals with a higher priority. For better understanding, this case will be described in detail below in conjunction with the accompanying drawings.

Figure 6:
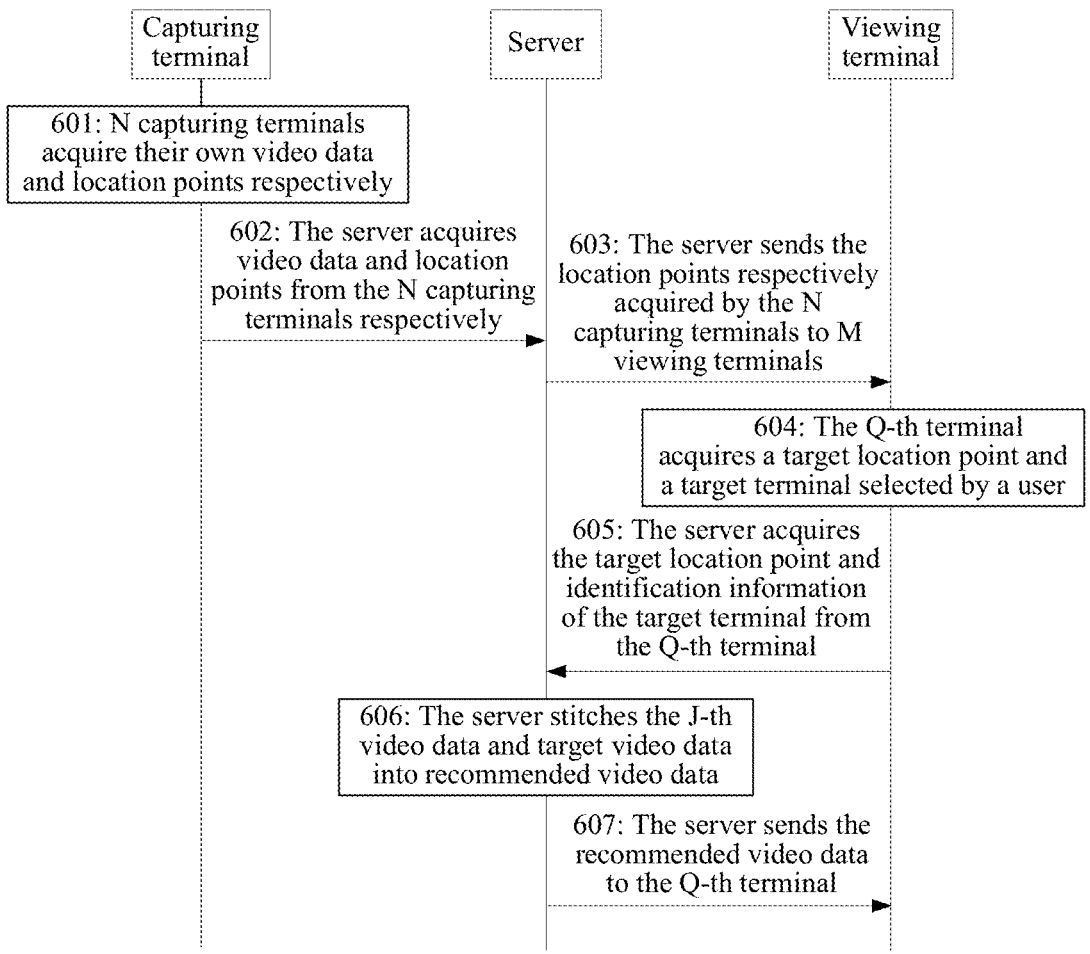
FIG. 6 is a schematic diagram of a video sharing method according to another embodiment of the present disclosure.

Referring to FIG. 6, a video sharing method according to a third embodiment of the present disclosure includes the following steps 601 to 607.

The above steps 401 to 402 may be referenced to steps 601 to 602, the detail of which will be repeated here.

In step 603, the server sends the location points respectively acquired by the N capturing terminals to M viewing terminals.

In this embodiment, the specific implementation of step 603 may refer to the above step 403. It should be noted that the location points sent by the server to the M viewing terminals may be regarded as options available for subscription, which are used for informing the M viewing terminals of these location points for selection, so as to obtain video data captured by the capturing terminal at the selected location point.

It should be noted that the server sends the location points respectively acquired by the N capturing terminals to the M viewing terminals in step 603, and then the M viewing terminals respectively send target location points to the server. These target location points may be regarded as subscription information, which is used for subscribing the video data captured by the capturing terminals at the target location point from the server. During the process, the server may count the popularity of each capturing terminal based on a first preset rule.

In an embodiment, the server may determine the J-th terminal as a popular terminal at the target location point based on the first preset rule, and the determination may include the following steps:

First, the server acquires the number of times R capturing terminals at the target location point are selected by the user of the viewing terminal;

Then, the server sorts the number of times that the R capturing terminals are selected; and Last, the server acquires the first top n capturing terminals among the R capturing terminals as popular terminals, where n may be a positive integer greater than or equal to 1. n may be defined by the developer, which is not limited in this disclosure.

In this embodiment, in a case of n equal to 1, if the J-th terminal is the most selected terminal among the R capturing terminals corresponding to the target location point, it is determined that the J-th terminal is the popular terminal at the target location point.

In step 604, the Q-th terminal acquires the target location point and the target terminal selected by the user.

In this embodiment, the specific way of the Q-th terminal acquiring the target location point selected by the user may refer to the above step 504 or 404, and the detail thereof will not be repeated here. If the target location point selected by the user corresponds to video data of multiple capturing terminals, the interface as shown in FIG. 5b is displayed to the user on the interactive interface of the Q-th terminal, and the user clicks on a location point, for example, the user clicks on the location point A on the interface, then the Q-th terminal takes the location point A as the target location point. At this time, if there are video data captured by R capturing terminals at the location point A for selection, then the Q-th terminal displays an option menu on the interactive interface. The option menu shows the identification information of the R capturing terminals that are available for selection at the location point A, where R is a positive integer less than or equal to N.

In an embodiment, description information of the R capturing terminals may be displayed in the options menu. The description information may include a nickname, a text profile, an avatar or other information, so that the user of the viewing terminal can make a decision and select a target terminal that he or she expects to watch.

In an embodiment, the description information in the option menu may also be used to remind the user that a certain capturing terminal in the option menu is a popular terminal. For example, when the J-th terminal in the option menu is a popular terminal, the terminal may be marked with an asterisk or other pre-set popular identifier to the end, so that the user acquires a recommendation when making a selection decision.

In step 605, the server acquires the target location point and identification information of the target terminal from the Q-th terminal.

In this embodiment, the server sends video data captured by the target terminal at the target location point to the Q-th terminal according to the target location point and the identification information of the target terminal. If the J-th terminal among the R capturing terminals is a popular terminal, but the user has not selected the J-th terminal as the target terminal, the following step 606 is performed.

In step 606, the server stitches the J-th video data and target video data into recommended video data.

In this embodiment, the J-th video data is video data captured by the popular terminal (i.e., the J-th terminal) at the target location point, and the target video data is video data captured by the target terminal selected by the user at the target location point. According to different application scenarios, the stitching of the two videos may include the following two brief solutions.

First, for recorded broadcast scenario, video data is not in real-time. Video data sent by the server to the viewing terminal is locally stored on the server, and video is edited by the server. The specific implementation is to stitch the J-th video data together with the target video data. For example, if the total duration of the target video data is 20 seconds, the video content in the target video data occupies the first ten seconds of the recommended video data, and the video content in the J-th video data occupies the last ten seconds of the recommended video data.

Second, for live broadcast scenario, video data is transmitted in real time. The real-time live video stream is directly sent by the server to the viewing terminal. In this case, the specific way of video stitching is the switching of the live video stream. For example, when the user has watched the video stream of the target terminal for a preset time duration, the server switches the video stream of the target terminal to the video stream of the J-th terminal. The recommended video stream is formed by such preset switching between the two video streams.

In step 607, the server sends the recommended video data to the Q-th terminal.

In this embodiment, the server sends the recommended video data to the Q-th terminal, so that the user of the Q-th terminal can watch not only the video captured by the target terminal he or she selected, but also the video captured by the popular terminal. The video captured by the popular terminal has been selected by most users, and it may be also favored by the user of the Q-th terminal, thereby ensuring video transmission efficiency and improving user experience.

In this embodiment, the popularity of multiple capturing terminals at the target location point is determined based on the first preset rule, and the video captured by the popular terminal is recommended to the user of the viewing terminal by means of video stitching, thereby improving the efficiency of video sharing, ensuring that the user of the viewing terminal watch more popular videos, and improving user experience.

It should be noted that different capturing terminals may capture videos at different capturing angles at a same location point. For example, a showroom is standing at the location point A of an exhibition hall. Standing at the location point A, a first scene may be seen if the capturing terminal captures leftward, and a second scene may be seen if the capturing terminal captures rightward. Though capturing at the same location point, the contents shown in the videos may be completely different due to different capturing angles. Therefore, in another implementation, in addition to the location point, the user of the viewing terminal should also be allowed to select the capturing angle of the location point, so that the user of the viewing terminal can select richer content. This case will be described in detail below in conjunction with the accompanying drawings.

Figure 7A:
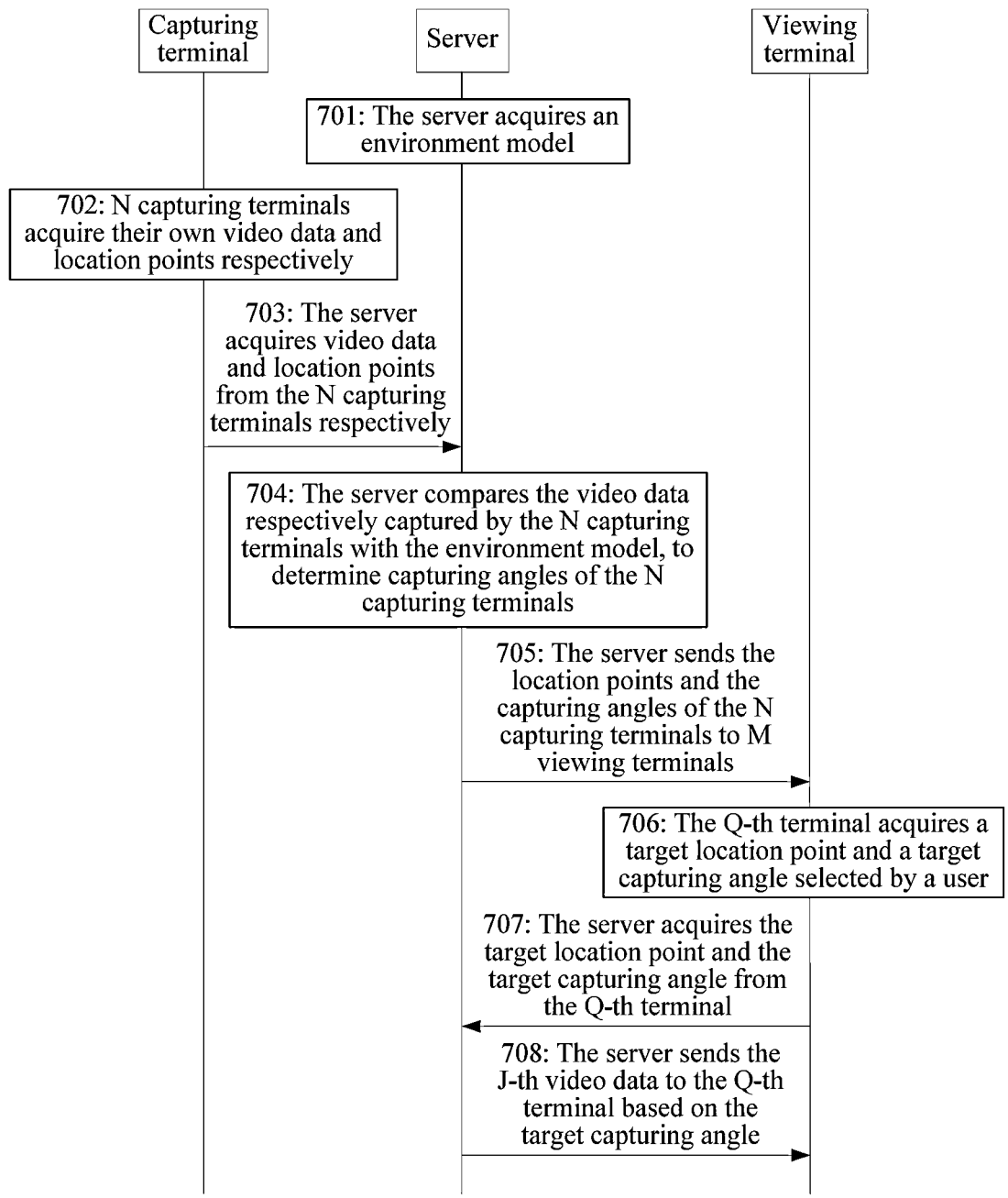
FIG. 7a is a schematic diagram of a video sharing method according to another embodiment of the present disclosure.

Referring to FIG. 7a, a video sharing method according to a fourth embodiment of the present disclosure may include the following steps 701 to 708.

In step 701, the server acquires an environment model.

In this embodiment, the environment model is used to record capturing environment of N capturing terminals. In a case of an exhibition, it is necessary to model the environment in the exhibition hall to obtain an environment model. For example, depth data and environmental data of various locations in the exhibition hall may be obtained by combining a depth camera with an infrared camera and a visual camera. The modeling method of the environment model may refer to the conventional technology, and those skilled in the art may choose any modeling method according to actual needs, which is not be described in detail in this embodiment of the present disclosure.

In step 702, N capturing terminals acquire their own video data and location points respectively.

In this embodiment, the N capturing terminals obtain their own video data at different capturing angles at respective location points in the capturing environment. The capturing environment is an environment going through environment modeling, such as an environment within an exhibition hall.

In step 703, the server acquires video data and location points from the N capturing terminals respectively.

In this embodiment, step 703 may refer to the above step 402, and the detail thereof will not be repeated here.

In step 704, the server compares the video data respectively captured by the N capturing terminals with the environment model, to determine capturing angles of the N capturing terminals.

In this embodiment, scene information of the capturing environment is recorded in the video data respectively captured by the N capturing terminals. The server matches the information with the environment model to know which scene in the capturing environment is captured in the current video data. Further combining with the location point information of the video data, the server may know the capturing location and the capturing angle of each video data.

More specifically, the server may match the video data with the environment model through visual positioning technology. In an embodiment, the visual positioning technology may be implemented in the following ways.

In step 1, GPS positioning technology is applied for coarse positioning.

In this embodiment, GPS address of a terminal is generally uploaded along with video data. In this embodiment, the positioning accuracy is required to reach the meter level, and the capturing terminal may be a smart phone or a camera. The application scenario is a gymnasium, museum, campus or other large venue, with a lot of shelters, a large flow of people and a constant surrounding environment. In consideration of features of a data source terminal and features of the surrounding environment, GPS positioning technology is initially selected for coarse positioning. Optionally, other positioning method in the conventional technology may also be used, which is not limited in this embodiment of the present disclosure.

In step 2, a target area is discretized.

In this embodiment, the target area is an area captured by the capturing terminal. The area is divided into multiple sub-areas, and the latitude and longitude ranges of each sub-area are recorded. Data is collected at intervals of m meters within each sub-area. Further, the 360° direction is also discretized into k angles. Image information and pose information on the k angles are collected, and a camera pose corresponding to each image is recorded.

Further, the camera pose is defined as (n, xi, yi, zi, αi, βi, v), where the x-axis is defined as the due north direction, the y-axis is defined as the due east direction, and the z-axis is defined as vertical upward to the ground, n is the sub-area where the camera is located; xi, yi and zi are the offsets of the location point on each axis relative to the center of the sub-area; aαi is an angle with the due north direction and is positive clockwise; βi is an angle with z-axis and is positive clockwise; and v is a movement speed.

In step 3, the target sub-area where the capturing terminal is located is determined according to the GPS coarse positioning information.

In this embodiment, it may first be determined which sub-area (divided in step 2) the capturing terminal is located in according to the GPS coarse positioning information. The target sub-area is one of the multiple sub-areas acquired in step 2.

In step 4, image information in the target sub-area is acquired from the server.

In this embodiment, the image information in each sub-area is preset in the server. For example, if the target area is an exhibition hall, then the staff acquires a panoramic image in the exhibition hall as the image information of the entire exhibition hall. The image information of each sub-region may be obtained through the discretization of the step 2.

In step 5, an image frame of video data is taken every preset time interval and matched with the image information in the target sub-area.

In this embodiment, a matching algorithm is used to extract an overall scene feature of an image in the video frame, and the feature is compared with the feature of the data set for similarity, to find an image with the highest similarity score, which is recorded as image I. The image I serves as a positioning image of the data terminal.

In step 6, pose information corresponding to the image I is acquired from the server, as the key frame pose information.

In this embodiment, pose information of a preset image in each sub-area is measured when the image is preset. The pose information includes position information, capturing angle information, or the like. The pose information of the video uploaded by the current capturing terminal may be matched by the above way.

In step 7, the key frame pose information is added to an identification code of the video data.

In this embodiment, the key frame pose information is added to the identification code of the video data, so that the video data uploaded by the capturing terminal includes pose information. Thus, the server and the viewing terminal can know the pose information of the video data.

In step 705, the server sends the location points and the capturing angles of the N capturing terminals to the M viewing terminals.

In this embodiment, the server sends the acquired location points and capturing angles to multiple viewing terminals, so that these viewing terminals can know the location points and capturing angles of the capturing terminals from which the video data currently can be seen.

In step 706, the Q-th terminal acquires a target location point and a target capturing angle selected by the user.

Figure 7B:
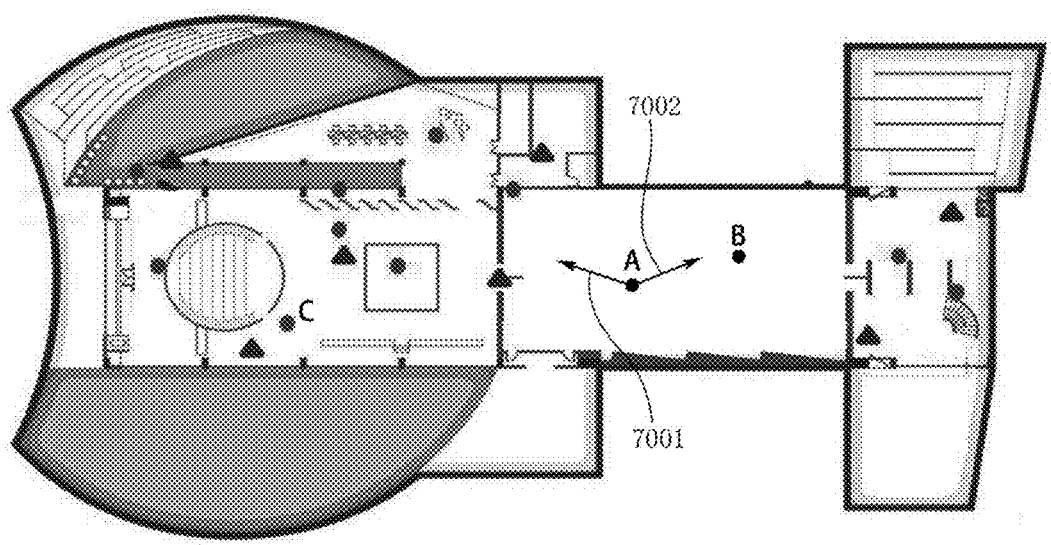
FIG. 7b is a schematic diagram of a video sharing method according to another embodiment of the present disclosure.

In this embodiment, the interface displayed by the Q-th terminal may be shown in FIG. 7b. FIG. 7b is a map of an exhibition hall. Some location points are marked in the map, and these location points are all location points sent by the server to the viewing terminal. In this way, the user may intuitively understand through this interface, location points in the exhibition hall from which the video data captured by the capturing terminal can be seen. Further, information for indicating the capturing angle is also provided on these location points. For example, the location point A in FIG. 7b is an optional location point. At this location point, the J-th terminal is capturing at the angle A1 and the other capturing terminal is capturing at the angle A2, then a first arrow 7001 extended from the location point A represents the angle A1, and a second arrow 7002 represents the angle A2. If the user selects the location point A and then selects the first arrow 7001, the Q-th terminal can know that the target location point selected by the user is the location point A, and the target capturing angle is the angle A1, that is, the video captured by the J-th terminal at the location point A is selected.

In step 707, the server acquires the target location point and the target capturing angle from the Q-th terminal.

In this embodiment, the Q-th terminal sends the target location point and the target capturing angle to the server, so that the server knows the information of video data that the Q-th terminal expects to obtain.

In step 708, the server sends the J-th video data to the Q-th terminal based on the target capturing angle.

In this embodiment, the J-th video data is the video data captured by the J-th terminal at the target capturing angle standing at the target location point.

In this embodiment, the server acquires the video captured by the capturing terminal, and visually identifies the video according to the pre-established environment model, so as to know the capturing angle of each video. The server sends the location point and capturing angle to the viewing terminal, so that the user of the viewing terminal can select not only the location point but also the capturing angle, which further refines the granularity of the video type that the user can select, and thereby provides users with more personalized options to further enhance the richness of video sharing.

It should be noted that, in some scenarios, such as in an exhibition hall scenario, the N capturing terminals are capturing video at different location points in the exhibition hall. Some location points may be relatively popular. For example, some popular showrooms in the exhibition hall have more capturing terminals being capturing videos at the same time. Although the capturing terminals are capturing at a same location point, the capturing angles of the capturing terminal are not the same. In this case, there may be a lot of capturing terminals to be selected at this popular location point. In order to enable the viewing terminal to see more capturing angles at the popular location point, videos at the popular location point may be stitched to generate a multi-angle panoramic video, so that the user of the viewing terminal can watch the multi-angle panoramic video at one glance.

Figure 8A:
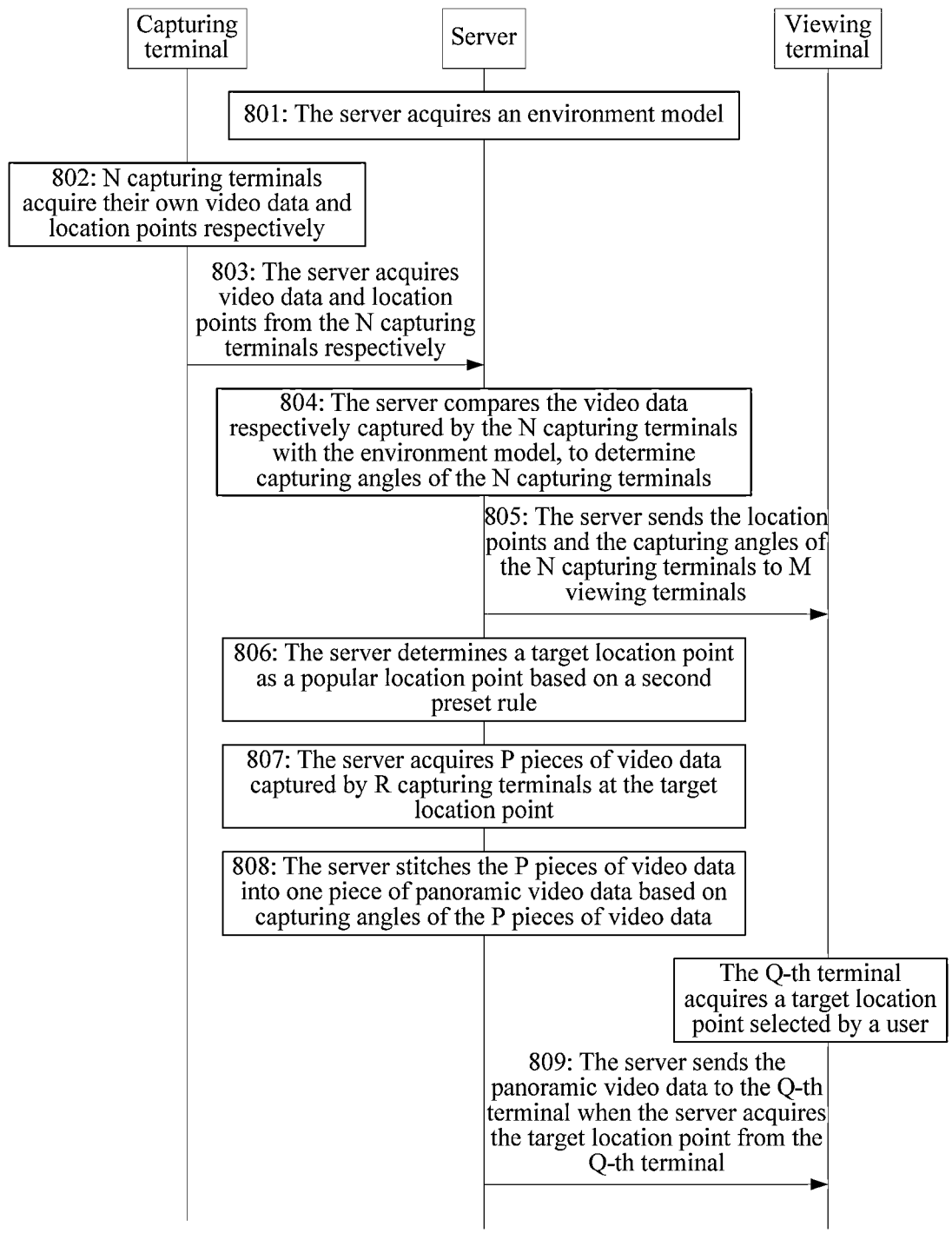
FIG. 8a is a schematic diagram of a video sharing method according to another embodiment of the present disclosure.

Referring to FIG. 8a, a video sharing method according to a fifth embodiment of the present disclosure includes the following steps 801 to 809.

For steps 801 to 805, reference may be made to the above steps 701 to 705, and the detail thereof will not be repeated here.

In step 806, the server determines the target location point as a popular location point based on a second preset rule.

In this embodiment, the second preset rule may be any rule for determining a popular location point. For example, the implementation of the second preset rule may include the following steps.

First, the server acquires location points sent by the M viewing terminals;

Then, the server counts the number of times the location points are selected by the M viewing terminals and sorts them; and Last, the server acquires the first n location points sorted as popular location points.

In this embodiment, a location point selected by more viewing terminals is determined as a popular location point, where n is a positive integer greater than or equal to 1, which is not limited in this disclosure. As an example, when n is equal to 1, the server acquires the target location point selected by most people as the popular location point.

In step 807, the server acquires P pieces of video data captured by R capturing terminals at the target location point.

In this embodiment, the R capturing terminals are all capturing terminals that capture videos at the target location point, where P is a positive integer greater than 1, and P may be or may not be equal to R.

In step 808, the server stitches the P pieces of video data into one piece of panoramic video data based on the capturing angles of the P pieces of video data.

Figure 8B:
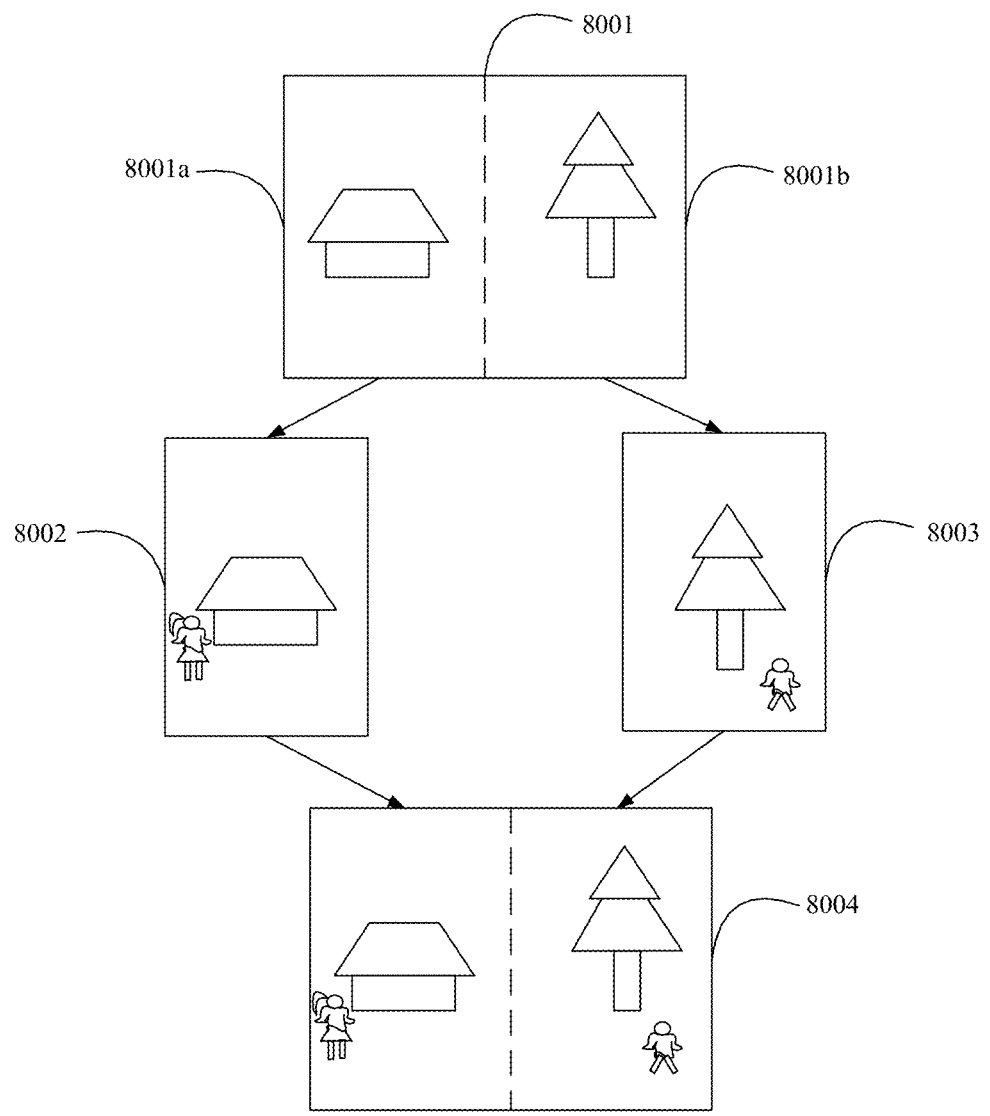
FIG. 8b is a schematic diagram of a video sharing method according to another embodiment of the present disclosure.

In this embodiment, the panoramic video data is recorded with captured images in P pieces of video data. For example, if P=2, the server has acquired video data at two different angles at the target location point, which are a first video and a second video respectively. Reference may be made to FIG. 8*b*. As shown in FIG. 8*b*, the scene 8001 includes two capturing angles, namely a first angle 8001*a* and a second angle 8001*b*. The first video 8002 is acquired by capturing the scene at the first angle 8001*a*, while the second video 8003 is acquired by capturing the scene at the second angle 8001*b*. Different parts in the scene are captured in the first video 8002 and the second video 8003 respectively. In this case, the server fuses the first video 8002 and the second video 8003 based on the capturing angles of the first video 8002 and the second video 8003 to obtain one piece of panoramic video data, that is, the third video 8004. Obviously, the third video 8004 records the captured images of the first video 8002 and the second video 8003, and also records the contents of two different capturing angles.

In step 809, when the server acquires the target location point from the Q-th terminal, the server sends the panoramic video data to the Q-th terminal.

In this embodiment, when the Q-th terminal sends the target location point to the server, the server can know that the Q-th terminal has currently selected a popular location point. At this point, the server sends the panoramic video data corresponding to the target location point to the Q-th terminal, so that the Q-th terminal can see the panoramic video of the popular scenic spot.

In this embodiment, in a case that the server acquires the capturing angle of the video captured by the capturing terminal, the server further determines which location point is a popular location point based on the second preset rule, and then stitches multiple videos together to obtain a piece of panoramic video based on the capturing angles of the multiple videos at the popular location point, so that the user of the view terminal can see the multi-angle content of the popular location point at one time through the panoramic video data, which improves the efficiency of video sharing and the richness of video content.

It should be noted that, as mentioned above, the method provided by the embodiment of the present disclosure may be applied to a live broadcast scenario as well as a recorded broadcast scenario. In the case of the recorded broadcast scenario, the server may store video data uploaded by the capturing terminal at different time points. There is a possibility that the capturing terminal captures video data at different time periods at a same location point. When the user selects this location point, it is necessary to confirm with the user of the viewing terminal to select the video data at which time point. For better understanding, this working way will be described in detail below in conjunction with the accompanying drawings.

Figure 9A:
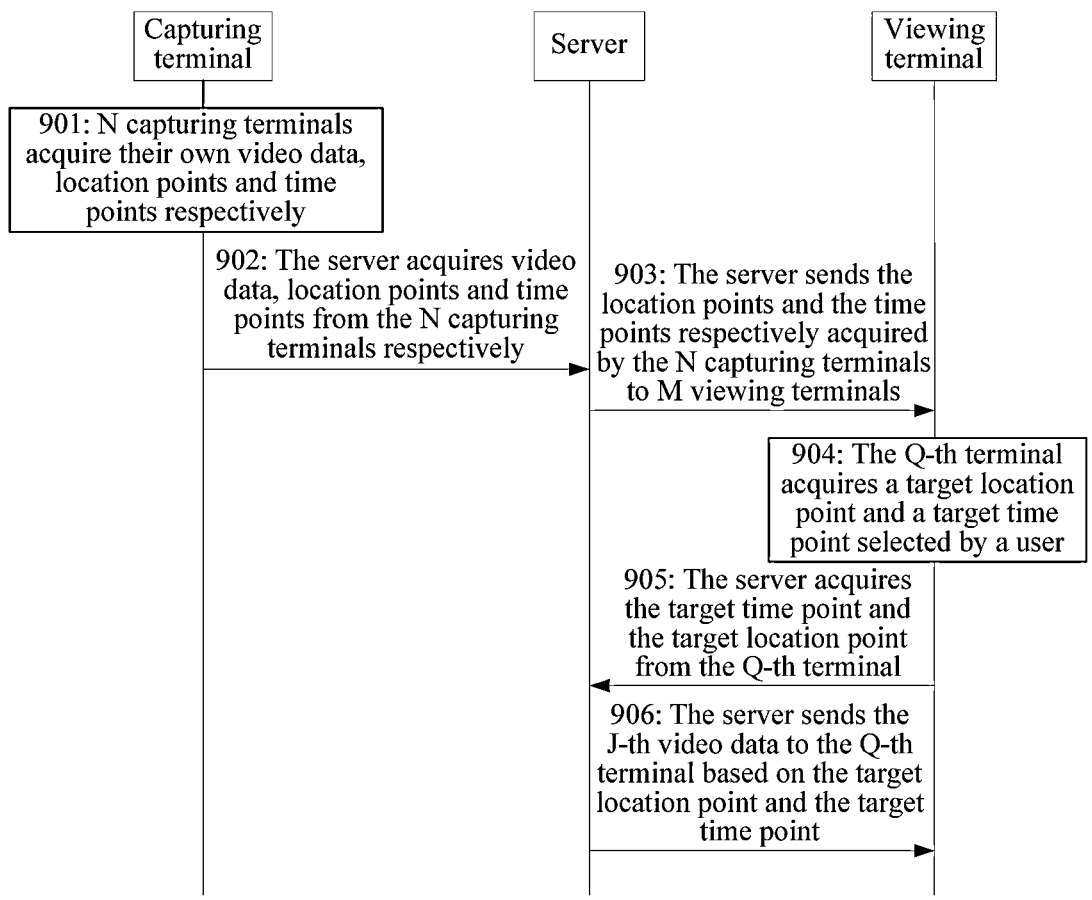
FIG. 9a is a schematic diagram of a video sharing method according to another embodiment of the present disclosure.

Referring to FIG. 9*a*, a video sharing method according to a sixth embodiment of the present disclosure includes the following steps 901 to 906.

In step 901, N capturing terminals acquire their own video data, location points and time points, respectively.

In this embodiment, the working way of the N capturing terminals to acquire their own video data and location points may refer to the above step 401. On this basis, when the N capturing terminals are capturing video data, the N capturing terminals also acquire time points at which the video data is acquired.

In step 902, the server acquires video data, location points and time points from the N capturing terminals respectively.

In this embodiment, the N capturing terminals send the acquired video data, location points and time points to the server.

In step 903, the server sends the location points and the time points respectively acquired by the N capturing terminals to M viewing terminals.

In this embodiment, M is a positive integer greater than 1. The server sends the acquired location points and time points to multiple viewing terminals, so that these viewing terminals can know location points at which video data captured by the capturing terminals can be seen, and time points at which video data is available for selection at each location point.

In step 904, the Q-th terminal acquires a target location point and a target time point selected by a user.

Figure 9B:
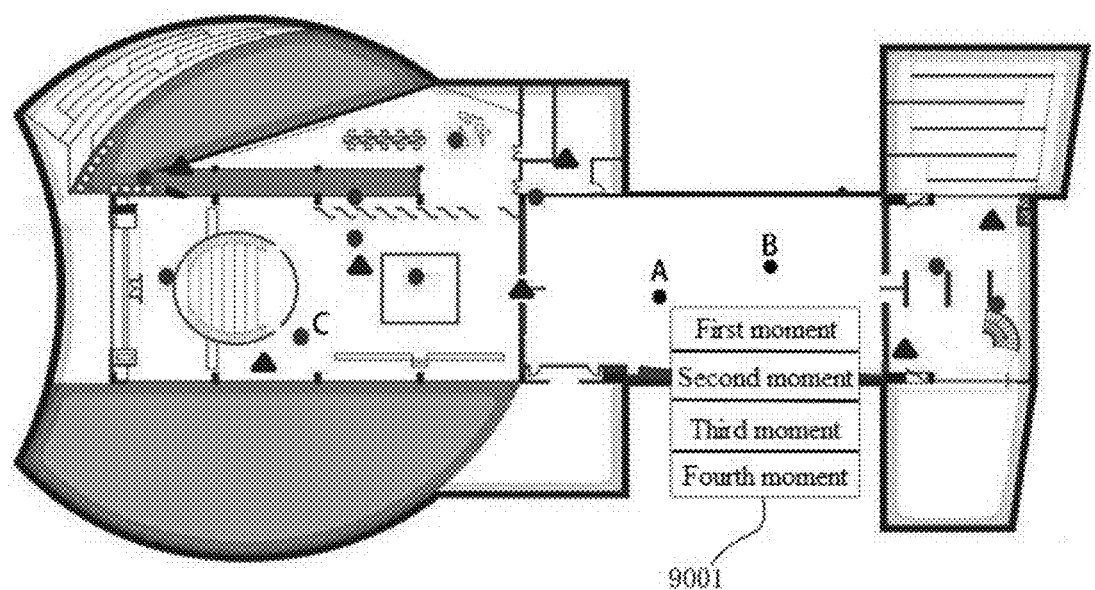
FIG. 9b is a schematic diagram of a video sharing method according to another embodiment of the present disclosure.

In this embodiment, the Q-th terminal is one of the M viewing terminals. The interactive interface of the Q-th terminal shows the user an interface as shown in FIG. 9*b*. When the user clicks a location point, for instance, the user clicks the location point A in the interface, the Q-th terminal takes the location point A as a target location point. In this case, if the location point A corresponds to multiple videos in multiple time periods for selection, the interface further displays an option menu 9001. The option menu 9001 displays different time points for the user to select video data at different time points.

In step 905, the server acquires the target time point and the target location point from the Q-th terminal.

In this embodiment, the Q-th terminal sends the acquired target time point and target location point to the server, so that the server knows the target time point and the target location point selected by the Q-th terminal.

In step 906, the server sends the J-th video data to the Q-th terminal based on the target location point and the target time point.

In this embodiment, the J-th video data is the video data acquired by the J-th terminal at the target time point at the target location point.

In this embodiment, in a case that video data is captured at different time periods at a location point, when the user of the viewing terminal selects a location point, it is necessary to further confirm with the user to watch the content at which time period, thereby refining the selection granularity in terms of time. The user of the viewing terminal can not only select video data at different location points, but also select video data at different time points at a certain location point, thus improving the richness of the content of video sharing.

It should be noted that, in the recorded broadcast scenario, for a certain location point, there may have video data at different time periods. The user of the viewing terminal can select the video at only one of the time points to watch each time. If the user wants to watch video data at multiple time points, the user has to switch back and forth, which is troublesome. To this end, video data at a same location point may be fused to include features of the video captured at each time period in one video, so that users can see the content at all time periods in one video. For better understanding, this working way will be described in detail below in conjunction with the accompanying drawings.

Figure 10A:
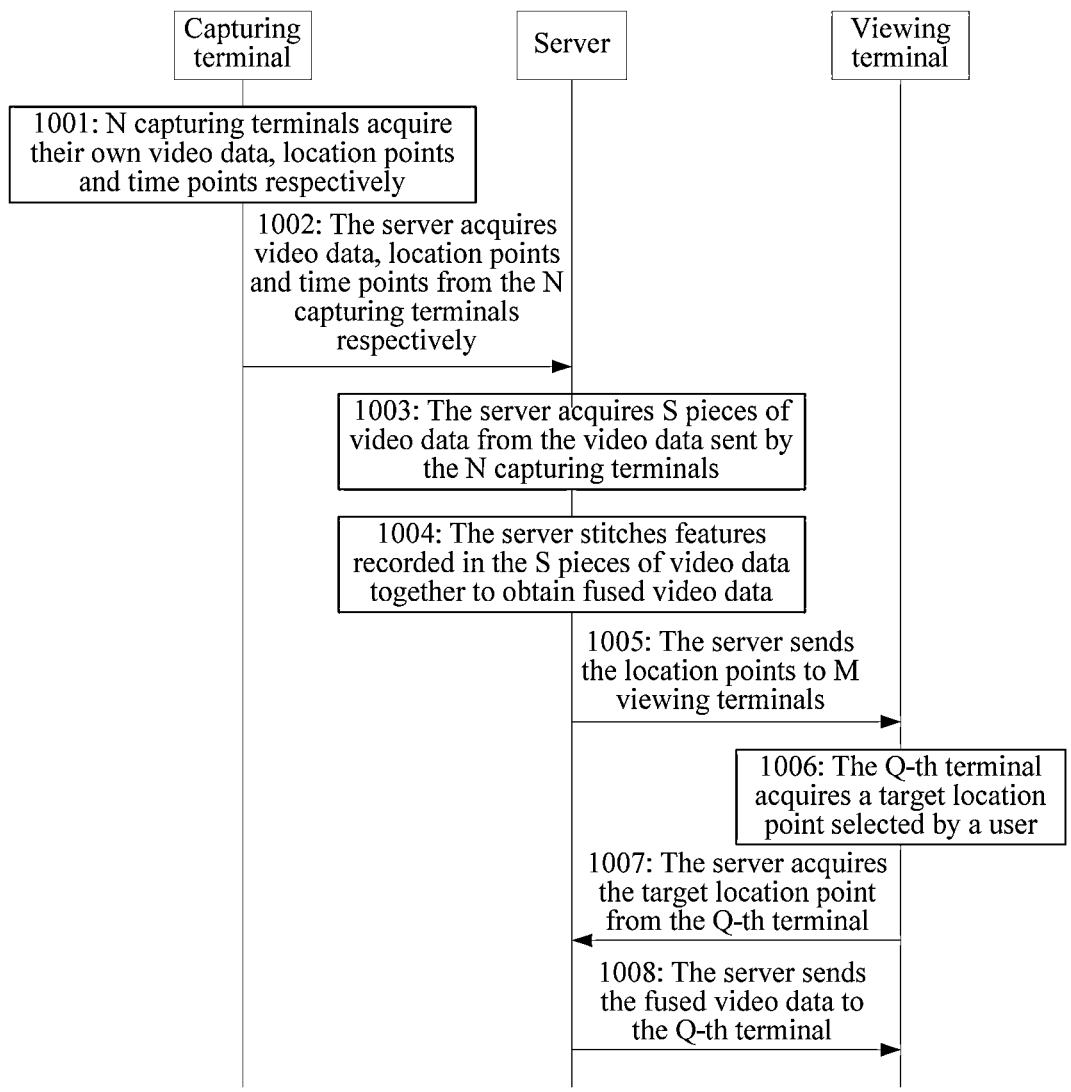
FIG. 10a is a schematic diagram of a video sharing method according to another embodiment of the present disclosure.

Referring to FIG. 10a, a video sharing method according to a seventh embodiment of the present disclosure includes the following steps 1001 to 1008.

In step 1001, N capturing terminals acquire their own video data, location points and time points, respectively.

In this embodiment, the working way of the N capturing terminals to acquire their own video data and location points may refer to the above step 401. On this basis, when the N capturing terminals are capturing video data, the N capturing terminals also acquire time points at which the video data is acquired.

In step 1002, the server acquires video data, location points and time points from the N capturing terminals, respectively.

In this embodiment, the N capturing terminals send the acquired video data, location points and time points to the server.

In step 1003, the server acquires S pieces of video data from the video data sent by the N capturing terminals.

In this embodiment, the S pieces of video data are all video data captured at the target location point within the target time period. The target time period is a preset time period, and may be set by those skilled in the art according to actual needs, which is not limited in this disclosure.

In step 1004, the server stitches features recorded in the S pieces of video data together to obtain fused video data.

Figure 10B:
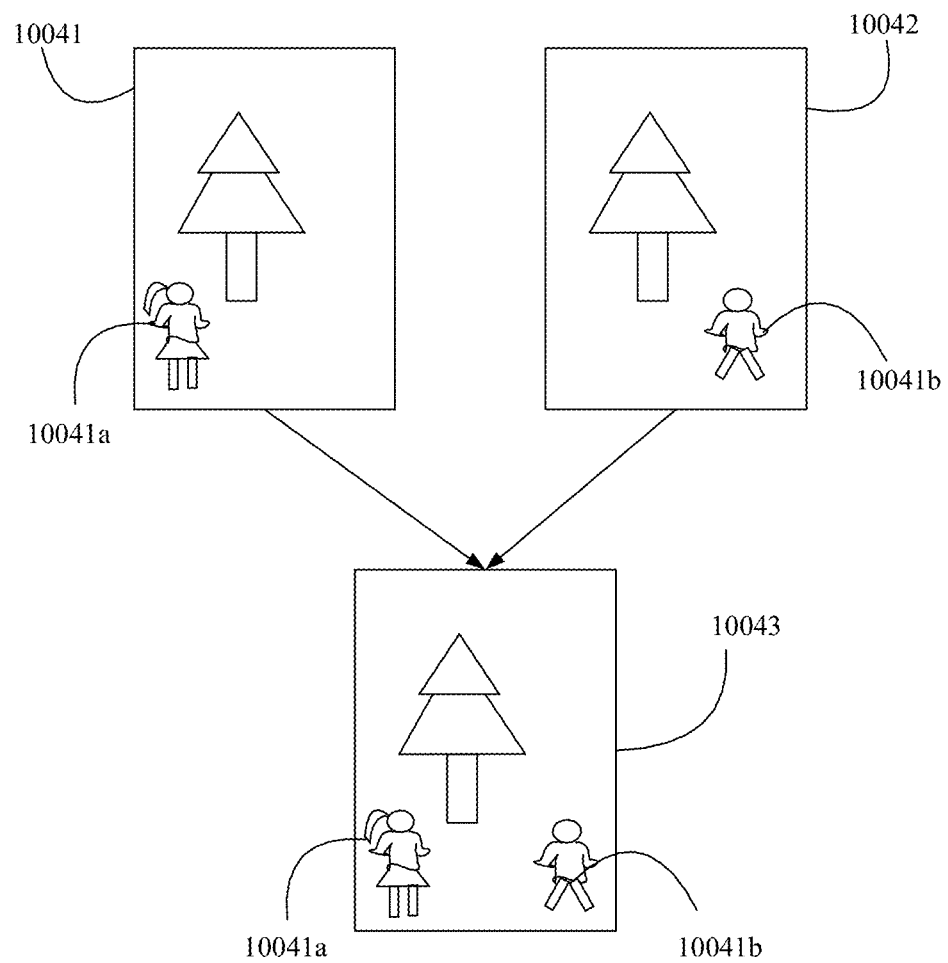
FIG. 10b is a schematic diagram of a video sharing method according to another embodiment of the present disclosure.

In this embodiment, the fused video data records all features captured at the target location point within the target time period. For example, as shown in FIG. 10b, for a same capturing angle of a same target location point, a capturing terminal captures a first video 10041 at a first moment in the target time period, where the feature recorded in the first video 10041 is a person A 10041a in the scene; another capturing terminal captures a second video 10042 at a second moment in the target time period, where the feature recorded in the second video 10042 is a person B 10041b in the scene. In an embodiment, the server may extract person A 10041a and person B 10041b from the first video 10041 and the second video 10042 respectively based on feature recognition and extraction algorithm. The feature recognition and extraction algorithm is the conventional technology, and those skilled in the art may select an appropriate feature recognition and extraction algorithm according to practical needs, which is not limited in this embodiment of the present disclosure. Further, after the server extracts the two features of person A 10041a and person B 10041b, the two features are stitched together to obtain one piece of fused video data 10043. The person A 10041a and person B 10041b in a same scene are both recorded in the fused video data 10043, so that the feature information recorded in videos at different time periods can be seen in one video.

In step 1005, the server sends the location points to M viewing terminals.

In this embodiment, step 1005 may refer to the above step 403, and the detail thereof will not be repeated here.

In step 1006, the Q-th terminal acquires a target location point selected by a user.

In this embodiment, the specific implementation of the Q-th terminal to acquire the target location point selected by the user may refer to the above step 404, and the detail thereof will not be repeated here. In a case that the target location point corresponds to multiple video data at multiple time periods, the following steps are performed.

In step 1007, the server acquires the target location point from the Q-th terminal.

In this embodiment, if the target location point corresponds to fused video data, the following step 1008 is performed.

In step 1008, the server sends the fused video data to the Q-th terminal.

In this embodiment, the fused video data is obtained in step 1004, and thus the user of the Q-th terminal can watch features recorded in all time periods through one video.

In this embodiment, in a case that video data is captured at a location point in different time periods, when the user of the viewing terminal selects a location point, and there is a possibility that the location point corresponds to multiple videos of different time periods, the server stitches videos acquired at all time points within multiple time periods, so that the user of the viewing terminal can see the features recorded at all time points within certain time periods in one video, which eliminates the step for the user to select the time point, also improves the efficiency of video transmission and reduces the amount of data transmitted between the server and the viewing terminal.

Further, the solution in the seventh embodiment of the present disclosure may be combined with the solution in the fifth embodiment. In the process of video stitching, not only video data at different time points but also video data at different capturing angles are stitched so that one piece of panoramic full-time video data can be obtained for a same location point. The panoramic full-time video data not only records video data of each capturing angle at the location point, but also records video features recorded at different time periods at each capturing angle, thereby further improving the richness of the video content. The users of the viewing terminal can see the content of all angles and all time periods through only one video. On the one hand, the number of interactions between the server and the viewing terminal is reduced, thereby improving the efficiency of video sharing. On the other hand, the user of the viewing terminal has a better user experience.

Various embodiments of video sharing methods provided in the present disclosure have been described above. It should be noted that, in the above embodiments, when the capturing terminal is capturing video data, it is necessary to acquire the current location point in real time, so as to implement the content of the solution. Further, in a case of live broadcast scene, the capturing terminal may be moving while uploading video data, which means the location point changes in real time. Therefore, the capturing terminal needs to accurately acquire the current location point, so as to ensure the smooth implementation of the solution of the present disclosure. A positioning method of the capturing terminal in the video sharing method according to an embodiment of the present disclosure will be described in detail below.

Figure 11A:
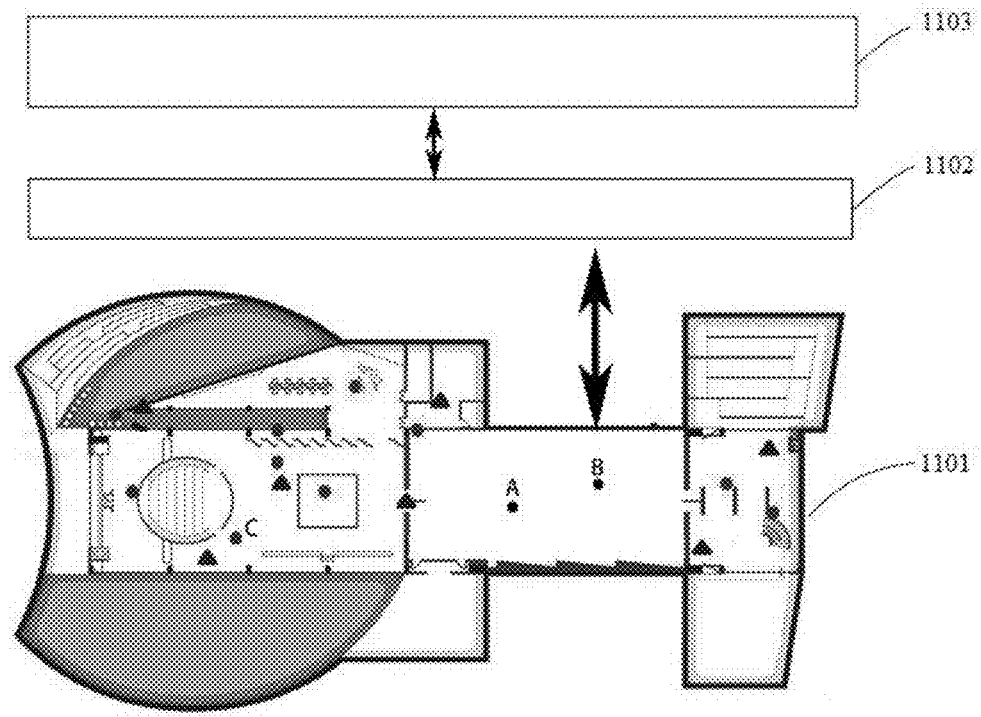
FIG. 11a is a schematic diagram of a network architecture of a video sharing method according to an embodiment of the present disclosure.

Reference may be made to FIG. 11a. In the system architecture as shown in FIG. 11a, there are multiple capturing terminals in the capturing scene 1101. The capturing terminals are connected to a cloud server 1103 through a network conversion layer 1102, so as to upload location points, video data and other information to the cloud server 1103. The access network of the capturing terminal may be a 4G network, a 5G network or a WIFI network, and those skilled in the art may select an access method according to actual needs, which is not limited in this embodiment of the present disclosure.

Furthermore, in the solution of the present disclosure, the capturing terminal acquires location points mainly in two different positioning environments: indoor positioning and outdoor positioning environments. Moreover, the capturing terminal may switch between the indoor and outdoor. In this case, the terminal may switch different positioning methods synchronously according to the change of the positioning environment.

The positioning method of the capturing terminal may include visual positioning, optical positioning, WIFI fingerprint positioning, global positioning system (GPS) positioning, or the like.

During operation, the capturing terminal identifies whether the current location is indoors or outdoors through visual positioning. For example, the capturing terminal sends the currently acquired video data to the server in real time, and then the server determines whether the image captured in the video data is located indoors or outdoors according to the pre-established environment model. The way of the server to acquire the environment model may refer to the description of the above step 701, and the detail thereof will not be repeated here. When the server determines that the capturing terminal is currently located indoors, the server instructs the capturing terminal to use the optical positioning or WIFI fingerprint positioning. The optical positioning and WIFI fingerprint positioning can work efficiently indoors, thus to realize more accurate positioning of the capturing terminal. Optionally, other indoor positioning method may also be used, which is not limited in the embodiment of the present disclosure. When the server determines that the capturing terminal is currently located outdoors, the server instructs the capturing terminal to use GPS positioning. Optionally, other outdoor positioning method may also be used, which is not limited in the embodiment of the present disclosure.

In this embodiment, the server first determines whether the capturing terminal is currently indoors or outdoors. When the capturing terminal is indoors, the server instructs the capturing terminal to use the indoor positioning method. When the capturing terminal is outdoors, the server instructs the capturing terminal to use the outdoor positioning method. In this way, the capturing terminal can accurately acquire the location information of the location point no matter in which scene.

Figure 11B:
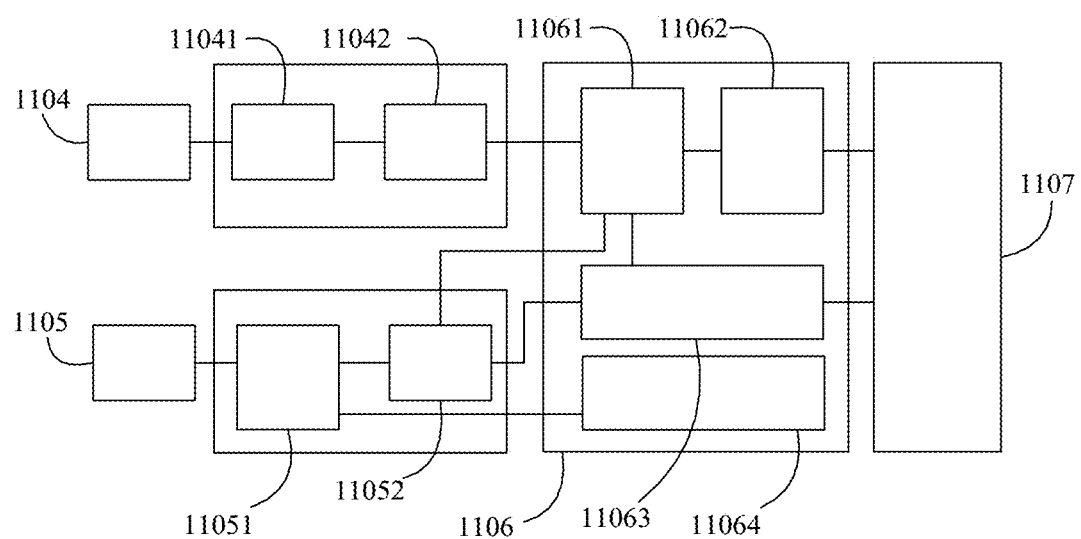
FIG. 11b is a schematic diagram of a system architecture of a video sharing method according to an the embodiment of the present disclosure.

Further, now reference may be made to FIG. 11b. The video sharing and video acquiring methods according to embodiments of the present disclosure may be implemented according to the architecture shown in FIG. 11b. As shown in FIG. 11b, the system may include a user terminal, a server terminal 1106 and an administrator terminal 1107. The user terminal includes a capturing terminal 1104 and a viewing terminal 1105. The capturing terminal 1104 is used to capture and upload a video to the server terminal 1106. The server 1106 is used to send the video captured by the capturing terminal 1104 to the viewing terminal 1105. During this process, the administrator terminal 1107 is used to schedule and manage the work of the system. There may be multiple viewing terminals 1105 and multiple capturing terminals 1104.

As shown in FIG. 11b, the capturing terminal 1104 uploads the captured video data through an app 11041 along with the positioning data when capturing the video. Then the video data and position data are uploaded to the server terminal 1106 through a wireless module (Router/Proxy) 11042. The server 1106 is provided with a video streaming service unit (Streaming Server) 11061 to receive and process the video uploaded by the capturing terminal 1104. The video stream service unit 11061 sends the video data uploaded by the capturing terminal 1104 as a video stream to a localization unit (Localization Server) 11062 and a video processing unit (Video Processing Server) 11063, respectively. The localization unit 11062 is used to send the video stream to the administrator terminal 1107, so that the administrator terminal 1107 can manage the video stream acquired by the server terminal 1106. The video processing unit 11063 is used to perform stitching processing and visual positioning on video streams. The specific implementation of video stitching and visual positioning may refer to the description in the above embodiments, and the detail thereof will not be repeated here. Moreover, the video processing unit 11063 also needs to send the processed stitched video to the administrator terminal 1107, so that the administrator terminal 1107 can view and manage the stitched video.

Further, the server terminal 1106 also includes a map unit 11064, and the map unit 11064 is used to send map information of a target area to the viewing terminal 1105. In an embodiment, the target area is the working area of the capturing terminal 1104, such as an exhibition hall, a campus or a library, etc. The map information may be a two-dimensional planar map or a panoramic map, which is not limited in this embodiment of the present disclosure.

After acquiring the map information sent by the server terminal 1106, the viewing terminal 1105 displays a map interface on the display interface through the app 11051. The location points of videos may be seen on the map interface. In an embodiment, the app 11051 used by the viewing terminal 1105 and the app 11041 used by the capturing terminal 1104 may be the same app or different apps, which is not limited in this embodiment of the present disclosure. The viewing terminal 1105 is provided with a video distribution unit 11052. When the user of the viewing terminal 1105 selects a location point on the map interface, the viewing terminal 1105 sends the location point to the server terminal 1106 through the video distribution unit (Video Distribute Module) 11052. The server terminal 1106 makes a determination based on the location point information. If there is only one capturing terminal 1104 having uploaded video data at the location point, then the server terminal 1106 directly sends the video data corresponding to the location point to the video distribution unit 11052 of the viewing terminal 1105 through the video streaming service unit 11061. The video distribution unit 11052 displays the video data on the display interface of the viewing terminal 1105 through the app, so that the user can watch the video data corresponding to the selected location point. If the location point selected by the user corresponds to multiple video data, the server may further confirm with the user to select which data from these video data, or directly send the stitched video data to the user through the video processing unit 11063. The stitched video data is the video data formed after stitching all video data at the location point. The specific stitching way may refer to the above embodiments, and the detail thereof will not be repeated here.

In an embodiment, the video data may be transmitted in live broadcast, or the uploaded video may be stored in the server 1106 and is operated in recorded broadcast, or is operated in both live broadcast and recorded broadcast, which is not limited in this embodiment of the present disclosure.

There may be multiple capturing terminals 1104 and multiple viewing terminals 1105 in the architecture shown in FIG. 11*b*. In combination with the video sharing and video acquiring methods provided by the embodiments of the present disclosure, multiple video sources can be shared to multiple users.

A video sharing method is provided in an embodiment of the present disclosure. The video sharing method includes: acquiring, by a server, video data and location points from N capturing terminals respectively, where the video data is used for recording videos captured by the capturing terminals, and the location points are used for recording locations of the capturing terminal upon acquiring the video data, where N is a positive integer greater than 1; sending, by the server, the location points respectively acquired by the N capturing terminals to M viewing terminals, where M is a positive integer greater than 1; acquiring, by the server, a target location point from a Q-th terminal, where the Q-th terminal is one of the M viewing terminals and 1≤Q≤M, and the target location point is one of the location points respectively acquired by the N capturing terminals; and sending, by the server, J-th video data to the Q-th terminal based on the target location point, where the J-th video data is video data captured by a J-th terminal at the target location point, and the J-th terminal is the J-th terminal among the N capturing terminals, where 1≤J≤N. With this method, multiple video capturing terminals can share video images to multiple viewing terminals, and users of multiple viewing terminals can autonomously select the video images shared by the capturing terminals located in different locations, thereby realizing many-to-many video sharing mode. The video sharing method can be applied to various scenarios, to enrich the video sharing and improve the convenience thereof.

In terms of hardware structure, the above method may be implemented by one entity device, or jointly implemented by multiple entity devices, or a logical function module in one entity device, which is not specifically limited in this embodiment of the present disclosure.

Figure 12:
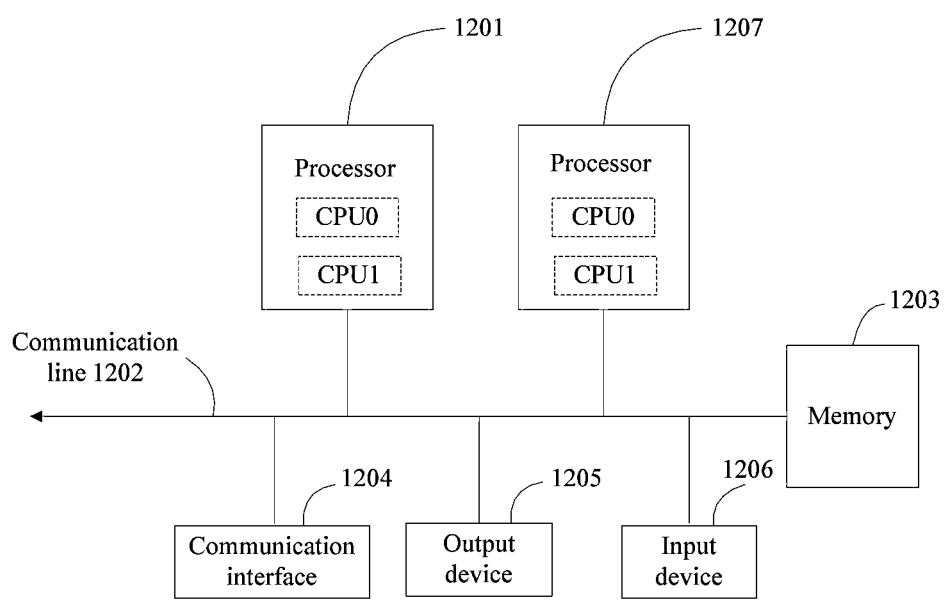
FIG. 12 is a schematic diagram of a server according to an embodiment of the present disclosure.

For example, the above information transmission method may be implemented by a network device in FIG. 12. FIG. 12 is a schematic diagram of a hardware structure of a network device according to an embodiment of the present disclosure. The network device may be the network device in an embodiment of the present disclosure, or may be a terminal device. The network device may include at least one processor 1201, a communication line 1202, a memory 1203 and at least one communication interface 1204.

The processor 1201 may be a general-purpose central processing unit (CPU), a microprocessor, an application-specific integrated circuit (server IC), or one or more integrated circuits for controlling the execution of a program of the solution of the present disclosure.

The communication line 1202 may include a pathway to transmit information between the above-described components.

The communication interface 1204 uses any device such as a transceiver to communicate with other devices or communication networks, such as Ethernet, radio access network (RAN), wireless local area network (WLAN) and so on.

The memory 1203 may be a read-only memory (ROM) or other types of static storage devices that can store static information and instructions, a random access memory (RAM) or other types of dynamic storage devices that can store information and instructions. The memory 1203 may also be electrically erasable programmable read-only memory (EEPROM), compact disc read-only memory (CD-ROM) or other optical disc storage, optical disc storage (including compact discs, laser discs, optical discs, digital versatile discs, Blu-ray discs, etc.), magnetic disc storage media or other magnetic storage devices, or any other media capable of carrying or storing desired program codes in the form of instructions or data structures and capable of being accessed by a computer, but not limited thereto. The memory may exist independently and may be connected to the processor through the communication line 1202. The memory may also be integrated with the processor.

The memory 1203 is used to store computer-executed instructions for implementing the solution of the present disclosure, and the execution is controlled by the processor 1201. The processor 1201 is configured to execute the computer-executed instructions stored in the memory 1203, so as to implement an accounting management method provided in the following embodiment of the present disclosure.

The computer-executed instructions in the embodiment of the present disclosure may also be referred to as application program codes, which is not specifically limited in the embodiment of the present disclosure.

In a specific implementation, as an embodiment, the processor 1201 may include one or more CPUs, such as CPU0 and CPU1 shown in FIG. 12.

In a specific implementation, as an embodiment, the network device may include multiple processors, such as processor 1201 and processor 1207 shown in FIG. 12. Each of these processors may be a single-core (single-CPU) processor or a multi-core (multi-CPU) processor. The processor herein may refer to one or more devices, circuits, and/or processing cores for processing data (e.g., computer program instructions).

In a specific implementation, as an embodiment, the network device may further include an output device 1205 and an input device 1206. The output device 1205 communicates with the processor 1201 and may display information in various ways. For example, the output device 1205 may be a liquid crystal display (LCD), a light emitting diode (LED) display device, a cathode ray tube (CRT) display device, a projector or the like. The input device 1206 communicates with the processor 1201 and may receive user input in various ways. For example, the input device 1206 may be a mouse, a keyboard, a touch screen device, a sensing device, or the like.

The network device may be a generic device or a dedicated device. In a specific implementation, the network device may be a server, a wireless terminal device, an embedded device, or a device having a structure similar to the structure shown in FIG. 12. The type of the network device is not limited in an embodiment of the present disclosure.

In an embodiment of the present disclosure, the network device may be divided in terms of functional units according to the above method example. For example, the network device may be divided into functional units according to functions, or two or more functions may be integrated into one processing unit. The integrated unit may be implemented in the form of hardware or in the form of software functional unit. It should be noted that the division of units in the embodiment of the present disclosure is schematic and is only a logical function division, and there may be other division way in practice.

Figure 13:
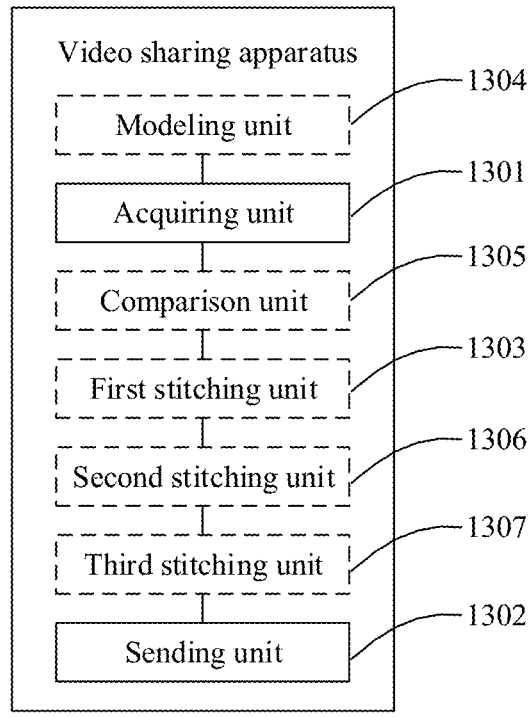
FIG. 13 is a schematic diagram of a video sharing apparatus according to an embodiment of the present disclosure.

For example, in a case of functional units divided in an integrated way, FIG. 13 shows a schematic structural diagram of a video sharing apparatus.

As shown in FIG. 13, the video sharing apparatus according to an embodiment of the present disclosure includes: an acquiring unit 1301 and a sending unit 1302.

The acquiring unit 1301 is configured to acquire video data and location points from N capturing terminals respectively. The video data is used for recording videos captured by the capturing terminals. The location points are used for recording locations of the capturing terminals upon acquiring the video data. N is a positive integer greater than 1;

The sending unit 1302 is configured to send the location points acquired by the acquiring unit 1301 from the N capturing terminals to M viewing terminals respectively, where M is a positive integer greater than 1.

The acquiring unit 1301 is further configured to acquire a target location point from a Q-th terminal. The Q-th terminal is one of the M viewing terminals, where $1 \leq Q \leq M$. The target location point is one of the location points respectively acquired by the N capturing terminals.

The sending unit 1302 is further configured to send J-th video data to the Q-th terminal based on the target location point acquired by the acquiring unit 1301. The J-th video data is video data captured by a J-th terminal at the target location point, and the J-th terminal is the J-th terminal among the N capturing terminals, where $1 \leq J \leq N$.

In an embodiment, the sending unit 1302 is further configured to send identification information of R capturing terminals to the Q-th terminal. The R capturing terminals are terminals that have captured video data at the target location point among the N capturing terminals, where $R \leq N$. The identification information is used for identifying the corresponding capturing terminals.

The acquiring unit 1301 is further configured to acquire identification information of a target terminal from the Q-th terminal. The target terminal is one of the R capturing terminals.

The sending unit 1302 is further configured to send target video data captured by the target terminal at the target location point to the Q-th terminal.

In an embodiment, the apparatus further includes a first stitching unit 1303. In a case that a server determines the J-th terminal as a popular terminal at the target location point based on a first preset rule, but the J-th terminal is not the target terminal, the first stitching unit 1303 is configured to: stitch the J-th video data and the target video data into recommended video data.

The sending unit 1302 is further configured to send the recommended video data to the Q-th terminal.

In an embodiment, the apparatus further includes a modeling unit 1304 and a comparison unit 1305.

The modeling unit 1304 is configured to acquire an environment model. The environment model is used for recording capturing environments of the N capturing terminals.

The comparison unit 1305 is configured to compare the video data respectively captured by the N capturing terminals with the environment model acquired by the modeling unit 1304, to determine capturing angles of the N capturing terminals.

The sending unit 1302 is configured to send the capturing angles of the N capturing terminals to the M viewing terminals.

The acquiring unit 1301 is further configured to acquire a target capturing angle from the Q-th terminal. The target capturing angle is one of the capturing angles of the N capturing terminals.

The sending unit 1302 is configured to send J-th video data to the Q-th terminal based on the target capturing angle. The J-th video data is video data captured by the J-th terminal at the target capturing angle.

In an embodiment, the apparatus further includes a second stitching unit 1306. In a case that the server determines the target location point as a popular location point based on a second preset rule, the second stitching unit 1306 is configured to:

acquire P pieces of video data captured by the R capturing terminals at the target location point, where P is a positive integer greater than 1; and stitch the P pieces of video data into one piece of panoramic video data based capturing angles of the P pieces of video data, where the panoramic video data records captured images in the P pieces of video data.

The sending unit 1302 is further configured to send the panoramic video data to the Q-th terminal when the server acquires the target location point from the Q-th terminal.

In an embodiment, the acquiring unit 1301 is further configured to acquire time points from the N capturing terminals respectively. The time points are used for recording moments at which the capturing terminals are acquiring the video data.

The sending unit 1302 is further configured to send the time points respectively acquired by the N capturing terminals to the M viewing terminals.

The acquiring unit 1301 is further configured to acquire a target time point from the Q-th terminal. The target time point is one of the time points respectively acquired by the N capturing terminals.

The sending unit 1302 is further configured to send the J-th video data to the Q-th terminal based on the target time point. The J-th video data is video data acquired by the J-th terminal at the target time point.

In an embodiment, the apparatus further includes a third stitching unit 1307. The acquiring unit 1301 is further configured to acquire S pieces of video data from the video data sent by the N capturing terminals. The S pieces of video data are all video data captured at the target location point within a target time period.

The third stitching unit 1307 is configured to stitch features recorded in the S pieces of video data into fused video data. The fused video data records all features captured at the target location point within the target time period.

The sending unit 1302 is further configured to send the fused video data to the Q-th terminal.

Figure 14:
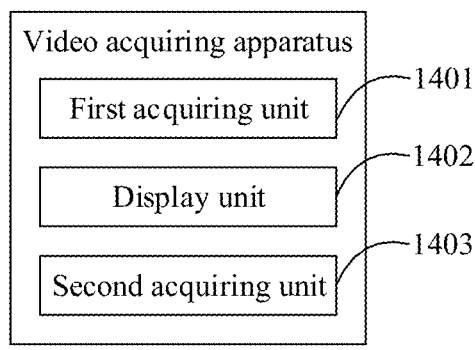
FIG. 14 is a schematic diagram of a video acquiring apparatus according to an embodiment of the present disclosure.

As shown in FIG. 14, a video acquiring apparatus is provided in an embodiment of the present disclosure. The video acquiring apparatus includes: a first acquiring unit 1401, a display unit 1402, a second acquiring unit 1403 and a sending unit.

The first acquiring unit 1401 is configured to acquire at least one location point from a server. The location point is uploaded to the server by N capturing terminals after capturing video data in a target area, where N is a positive integer greater than 1.

The display unit 1402 is configured to display a map interface on a display interface. The map interface is a map interface of the target area, and the map interface includes the at least one location point acquired by the first acquiring unit 1401.

The second acquiring unit 1403 is configured to acquire a target location point selected by a user from the map interface. The target location point is one of the at least one location point.

The sending unit is configured to send the target location point acquired by the second acquiring unit 1403 to the server.

The first acquiring unit 1401 is further configured to acquire J-th video data from the server. The J-th video data is video data captured by a J-th terminal at the target location point in the target area. The J-th terminal is one of the N capturing terminals, where $1 \leq J \leq N$.

In an embodiment, in a case that the target location point corresponds to multiple video data captured by multiple capturing terminals, the first acquiring unit 1401 is further configured to: acquire identification information of R capturing terminals from the server. All the R capturing terminals are capturing terminals that have captured video data at the target location point, where $1 \leq R \leq N$.

The display unit 1402 is configured to display identification information of the R capturing terminals on a display interface.

The second acquiring unit 1403 is further configured to acquire identification information of the J-th terminal selected by a user. The J-th terminal is one of the R capturing terminals.

The sending unit is configured to send the identification information of the J-th terminal to the server.

In an embodiment, the first acquiring unit 1401 is further configured to acquire capturing angles of the N capturing terminals from the server.

The display unit 1402 is configured to display capturing angles of the R capturing terminals on the display interface.

The second acquiring unit 1403 is further configured to acquire a target capturing angle selected by the user. The target capturing angle is one of the capturing angles of the R capturing terminals.

The sending unit is configured to send the target capturing angle to the server. The target capturing angle is used for requesting the server to send video data captured by the capturing terminals at the target capturing angle.

In an embodiment, the first acquiring unit 1401 is further configured to acquire at least one time point from the server. The at least one time point is time points at which the N capturing terminals are capturing the video data.

The display unit 1402 is further configured to display the at least one time point on the display interface.

The second acquiring unit 1403 is further configured to acquire a target time point selected by the user. The target time point is one of the at least one time point.

The second acquiring unit 1403 is further configured to send the target time point to the server. The target time point is used for requesting the server to send videos captured by the capturing terminals at the target time point.

The above embodiment may be wholly or partially implemented by software, hardware, firmware or any combination thereof. When implemented by software, the above embodiment may be implemented in whole or in part in the form of a computer program product.

The computer program product includes one or more computer instructions. When the computer program instructions are loaded and executed on the computer, the processes or functions according to the embodiments of the present disclosure will be generated in whole or in part. The computer may be a general purpose computer, a special purpose computer, a computer network, or other programmable device. The computer instructions may be stored in a computer-readable storage medium, or transmitted from a computer-readable storage medium to another computer-readable storage medium. For example, the computer instructions may be transmitted from a website, computer, server, or data center to another website site, computer, server, or data center by wired (e.g., coaxial cable, fiber optic, digital subscriber line (DSL)) or wireless (e.g., infrared, wireless, microwave, etc.) means. The computer-readable storage medium may be any available medium that can be stored by a computer, or a data storage device such as a server and a data center integrated with one or more available media. The available medium may be a magnetic medium (e.g., a floppy disk, a hard disk, or a magnetic tape), an optical medium (e.g., DVD), or a semiconductor medium (e.g., a Solid State Disk (SSD)) and so on.

Those skilled in the art may clearly understand that for the convenience and brevity of the description, the specific working process of the above system, apparatus and unit may refer to the corresponding process in the foregoing method embodiment, which will not be repeated here.

In the several embodiments provided in the present disclosure, it should be understood that the disclosed communication method, relay device, host base station, and computer storage medium may be implemented in other ways. For example, the apparatus embodiments described above are only illustrative. For example, the division of units is only a logical function division. In practice, there may be other division methods. As an example, multiple units or components may be combined or integrated into another system, or some features may be ignored or not implemented. In another point, the mutual coupling or direct coupling or communication connection shown or discussed may be through some interfaces, and the indirect coupling or communication connection of apparatuses or units may be in electrical, mechanical or other forms.

The units described as separate components may or may not be physically separated, and the components shown as units may or may not be physical units, that is, they may be located in one place, or may be distributed to multiple network units. Part or all of the units may be selected according to actual needs to achieve the purpose of the solution of this embodiment.

In addition, functional units in each embodiment of the present disclosure may be integrated into one processing unit, or each unit may exist separately physically, or two or more units may be integrated into one unit. The above integrated unit may be implemented in the form of hardware or in the form of a software functional unit.

If the integrated unit is implemented in the form of a software function unit and is sold or used as an independent product, it may be stored in a computer-readable storage medium. Based on this understanding, the substance of the technical solution of the present disclosure, or part of the technical solution making the contribution to the conventional technology, or all or part of the technical solution may be embodied in the form of a software product. The computer software product is stored in a storage medium, including several instructions for enabling a computer device (e.g., a personal computer, server, or network device, etc.) to implement all or part of steps of the methods described in various embodiments of the present disclosure. The storage medium includes: U disk, mobile hard disk, read-only memory (ROM), random access memory (RAM), magnetic disk or optical disk, or other various media capable of storing program codes.

As mentioned above, the above embodiments are only used to illustrate the technical solutions of the present disclosure, and are not intended to limit them. Although the present disclosure has been described in detail with reference to the foregoing embodiments, those skilled in the art should understand that modifications may be made to the technical solutions described in the above embodiments, or some of technical features may be equivalently replaced. Such modifications or replacements do not make the substance of corresponding technical solutions depart from the spirit and scope of the technical solutions of the various embodiments of the present disclosure.

The invention claimed is:

1. A video sharing method, comprising:
acquiring, by a server, video data regarding videos captured by N capturing terminals, time points regarding moments at which the N capturing terminals are acquiring the video data, and location points regarding locations at which the N capturing terminals acquire the video data, from the N capturing terminals respectively, wherein N is a positive integer greater than 1;
sending, by the server, the location points and the time points respectively acquired by the N capturing terminals to M viewing terminals, wherein M is a positive integer greater than 1;
acquiring, by the server, a target location point and a target time point from a Q-th terminal, wherein the Q-th terminal is one of the M viewing terminals, and 1≤Q≤M, and wherein the target location point is one of the location points, and the target time point is one of the time points; and
sending, by the server, J-th video data to the Q-th terminal based on the target location point, wherein the J-th video data is video data captured by a J-th terminal at the target time point at the target location point, and the J-th terminal is one of the N capturing terminals, wherein 1≤J≤N.

2. The method according to claim 1, wherein in a case that the target location point corresponds to video data captured by more than one of the capturing terminals, after acquiring, by the server, the target location point from the Q-th terminal, the method further comprises:
sending, by the server, identification information of R capturing terminals to the Q-th terminal, wherein the R capturing terminals are terminals that have captured video data at the target location point among the N capturing terminals, wherein 1≤R≤N, and the identification information is used for identifying the corresponding capturing terminals;
acquiring, by the server, identification information of the J-th terminal from the Q-th terminal, wherein the J-th terminal is one of the R capturing terminals; and
sending, by the server, the J-th video data captured by the J-th terminal at the target location point to the Q-th terminal.

3. The method according to claim 2, wherein the method comprises:
determining, by the server, at least one capturing terminal of the R capturing terminals as a popular terminal based on a first preset rule, wherein the popular terminal is not the J-th terminal,
wherein after acquiring, by the server, the target location point from the Q-th terminal, the method further comprises:

stitching, by the server, the J-th video data and popular video data into recommended video data, wherein the popular video data is video data captured by the popular terminal,
wherein the sending, by the server, the J-th video data to the Q-th terminal based on the target location point comprises:
sending, by the server, the recommended video data to the Q-th terminal.

4. The method according to claim 3, wherein before acquiring, by the server, the video data and the location points from the N capturing terminals respectively, the method further comprises:
acquiring, by the server, an environment model, wherein the environment model is used for recording capturing environments of the N capturing terminals,
wherein after acquiring, by the server, the video data and the location points from the N capturing terminals respectively, the method further comprises:
comparing, by the server, the video data respectively captured by the N capturing terminals with the environment model to determine capturing angles of the N capturing terminals;
sending, by the server, the capturing angles of the N capturing terminals to the M viewing terminals;
acquiring, by the server, a target capturing angle from the Q-th terminal, wherein the target capturing angle is one of the capturing angles of the N capturing terminals; and
sending, by the server, the J-th video data to the Q-th terminal based on the target capturing angle, wherein the J-th video data is video data captured by the J-th terminal at the target capturing angle.

5. The method according to claim 4, wherein in a case that the server determines the target location point as a popular location point based on a second preset rule, the method further comprises:
acquiring, by the server, P pieces of video data captured by the R capturing terminals at the target location point, wherein P is a positive integer greater than 1;
stitching, by the server, the P pieces of video data into one piece of panoramic video data based on capturing angles of the P pieces of video data, wherein the panoramic video data records captured images in the P pieces of video data; and
sending, by the server, the panoramic video data to the Q-th terminal, upon the server acquiring the target location point from the Q-th terminal.

6. The method according to claim 1, further comprising:
acquiring, by the server, S pieces of video data from the video data sent by the N capturing terminals, wherein the S pieces of video data are all video data captured at the target location point within a target time period; and
stitching, by the server, features recorded in the S pieces of video data into fused video data,
wherein the fused video data records all features captured at the target location point within the target time period,
wherein after acquiring, by the server, the target location point from the Q-th terminal, the method further comprises:
sending, by the server, the fused video data to the Q-th terminal.

7. A video acquiring method, comprising:
acquiring, by a viewing terminal, at least one location point and at least one time point from a server, wherein the at least one location point is uploaded to the server by N capturing terminals after capturing video data at the at least one time point in a target area, wherein N is a positive integer greater than 1;

displaying, by the viewing terminal, a map interface on a display interface, wherein the map interface is a map interface of the target area, and the map interface comprises the at least one location point;

displaying, by the viewing terminal, the at least one time point on the display interface;

acquiring, by the viewing terminal, a target location point and a target time point selected by a user from the display interface, wherein the target location point is one of the at least one location point, the target time point is one of the at least one time point;

sending, by the viewing terminal, the target location point and the target time point to the server; and acquiring, by the viewing terminal, J-th video data from the server, wherein the J-th video data is video data captured by a J-th terminal at the target time point at the target location point in the target area, and the J-th terminal is one of the N capturing terminals, wherein $1 \leq J \leq N$.

8. The method according to claim 7, wherein in a case that the target location point corresponds to video data captured by more than one of the capturing terminals, the method further comprises:

acquiring, by the viewing terminal, identification information of R capturing terminals from the server, wherein all the R capturing terminals are capturing terminals that have captured video data at the target location point, wherein $1 \leq R \leq N$, wherein after acquiring, by the viewing terminal, the target location point selected by the user from the map interface, the method further comprises:

displaying, by the viewing terminal, the identification information of the R capturing terminals on the display interface;

acquiring, by the viewing terminal, identification information of the J-th terminal selected by the user, wherein the J-th terminal is one of the R capturing terminals; and sending, by the viewing terminal, the identification information of the J-th terminal to the server.

9. The method according to claim 8, wherein after acquiring, by the viewing terminal, the at least one location point from the server, the method further comprises:

acquiring, by the viewing terminal, capturing angles of the N capturing terminals from the server, wherein after acquiring, by the viewing terminal, the target location point selected by the user from the map interface, the method further comprises:

displaying, by the viewing terminal, capturing angles of the R capturing terminals on the display interface;

acquiring, by the viewing terminal, a target capturing angle selected by the user, wherein the target capturing angle is one of the capturing angles of the R capturing terminals; and sending, by the viewing terminal, the target capturing angle to the server, wherein the target capturing angle is used for requesting the server to send video data captured by the capturing terminals at the target capturing angle.

10. A server, comprising: an interactive device, an input/output (I/O) interface, a processor, and a memory for storing program instructions, wherein the interactive device is configured to acquire an operation instruction inputted by a user, and the processor is configured to execute the program instructions stored in the memory to implement the method according to claim 1.

11. A terminal device, comprising: an interactive device, an input/output (I/O) interface, a processor, and a memory for storing program instructions, wherein the interactive device is configured to acquire an operation instruction inputted by a user, and the processor is configured to execute the program instructions stored in the memory to implement the method according to claim 7.

12. A non-transitory computer-readable storage medium, comprising instructions, wherein the instructions when executed on a computer device, cause the computer device to implement the method according to claim 1.

13. A non-transitory computer-readable storage medium, comprising instructions, wherein the instructions when executed on a computer device, cause the computer device to implement the method according to claim 7.

* * * * *